US012785727B2

(12) United States Patent
Keskin et al.

(10) Patent No.: US 12,785,727 B2
(45) Date of Patent: Nov. 3, 2026

(54) ENVELOPE TRACKING FOR RADIO FREQUENCY (RF) FRONT END MODULES

(71) Applicant: QUALCOMM Incorporated, San Diego, CA (US)

(72) Inventors: Mustafa Keskin, San Diego, CA (US); Paul Brian Sheehy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 17/935,071

(22) Filed: Sep. 23, 2022

(65) Prior Publication Data

US 2024/0106467 A1 Mar. 28, 2024

(51) Int. Cl.
*H04B 1/00* (2006.01)
*H04B 1/04* (2006.01)

(52) U.S. Cl.
CPC ......... *H04B 1/0078* (2013.01); *H04B 1/0458* (2013.01); *H04B 2001/0408* (2013.01)

(58) Field of Classification Search
CPC ................ H04B 1/0078; H04B 1/0458; H04B 2001/0408; H03F 2200/451; H03F 3/189; H03F 1/0288; H03F 1/0227; H03F 3/245
See application file for complete search history.

(56) References Cited

U.S. PATENT DOCUMENTS

2013/0093511 A1* 4/2013 Baek ..................... H03F 1/0288 330/124 R
2024/0106395 A1* 3/2024 Keskin .................. H03F 1/0227

FOREIGN PATENT DOCUMENTS

CN 113054934 A * 6/2021 ............... H03F 1/00
EP 2705604 B1 * 4/2020 .............. H02M 3/07

OTHER PUBLICATIONS

International Search Report and Written Opinion—PCT/US2023/074398—ISA/EPO—Jan. 12, 2024.

* cited by examiner

*Primary Examiner* — Umair Ahsan
(74) *Attorney, Agent, or Firm* — Polsinelli LLP/Qualcomm

(57) ABSTRACT

Aspects described herein include devices and methods for generating a supply voltage for a power amplifier. One aspect is an apparatus including a first amplifier and a second amplifier having a control input, where the control input of the second amplifier is configured to set a power state for the second amplifier. The apparatus has an input interface circuit coupled to the two amplifiers, sensing and conditioning circuitry coupled between the amplifier outputs and switcher circuitry, and output filter circuitry, where the output of the first amplifier is coupled to an output power port via the output filter circuitry, and where the output of the second amplifier is coupled to the output power port via the output filter circuitry.

22 Claims, 13 Drawing Sheets

ENVELOPE TRACKING FOR RADIO FREQUENCY (RF) FRONT END MODULES

FIELD

The present disclosure relates generally to electronics and wireless communications. For example, aspects of the present disclosure relate to power envelope tracking and power management in radio frequency (RF) front end (RFFE) modules used in wireless communications.

BACKGROUND

Wireless communication devices and technologies are becoming ever more prevalent. Wireless communication devices generally transmit and receive communication signals. RFFE modules are wireless communication apparatuses that power wireless transmit signals, and can also manage reception of wireless signals from an antenna. With the increasing prevalence of wireless communication technologies and increasing communication system throughputs and increasing complexity of power management for wireless devices, RFFE modules are becoming a larger component of wireless devices. Limiting power usage and managing power efficiency is an important goal of device design, particularly for mobile devices.

SUMMARY

Various implementations of systems, methods, and devices within the scope of the appended claims each have several aspects, no single one of which is solely responsible for the desirable attributes described herein. Without limiting the scope of the appended claims, some prominent features are described herein.

Aspects described herein include devices, wireless communication apparatuses, circuits, and modules supporting wireless communications, with an envelope tracking power supply used to match power supplied to a transmit power amplifier to the power needed for a signal to be transmitted via an antenna.

One aspect is a method for amplifying a wireless communication signal. The method comprises calculating, by control circuitry of a modem, envelope information for a transmit signal; generating, by a radio frequency front end (RFFE), the transmit signal; providing a voltage to a power amplifier of the RFFE by an envelope tracking power supply, wherein the envelope tracking power supply comprises: an envelope signal input port configured to receive an envelope tracking signal generated from the envelope information; an output power port configured to provide the voltage to the power amplifier; a first amplifier having an input and an output; a second amplifier having an input, an output, and a control input, wherein the control input of the second amplifier is configured to program the second amplifier based on a current operating mode selected from a plurality of operating modes; an input interface circuit having an input coupled to the envelope signal input port, a first output coupled to the input of the first amplifier, and a second output coupled to the input of the second amplifier; sensing and conditioning circuitry having an output and one or more inputs coupled to the output of the first amplifier and the output of the second amplifier; switcher circuitry having an input and an output, wherein the input is coupled to the output of the sensing and conditioning circuitry, and wherein the output is coupled to the output power port; and output filter circuitry, wherein the output of the first amplifier is coupled to the output power port via the output filter circuitry, and wherein the output of the second amplifier is coupled to the output power port via the output filter circuitry.

In some aspects, such a method operates where providing the voltage to the power amplifier comprises programming the second amplifier with a control input signal at the control input, wherein the control input signal is based on the current operating mode, a radio access technology (RAT) configuration, a peak-to-average power ratio value of a radio frequency (RF) signal, or a bandwidth of the RF signal.

Another aspect is wireless communication apparatus. The wireless communication apparatus comprises: means for calculating envelope information for a transmit signal; means for generating the transmit signal; means for providing an envelope tracking voltage to power a power amplifier that amplifies the transmit signal.

Another aspect is an apparatus. The apparatus is an envelope tracking power supply comprising: an envelope signal input port; an output power port; a first amplifier having an input and an output; a second amplifier having an input, an output, and a control input, wherein the control input of the second amplifier is configured to set a power state for the second amplifier; an input interface circuit having an input coupled to the envelope signal input port, a first output coupled to the input of the first amplifier, and a second output coupled to the input of the second amplifier; sensing and conditioning circuitry having an output and one or more inputs coupled to the output of the first amplifier and the output of the second amplifier; switcher circuitry having an input and an output, wherein the input is coupled to the output of the sensing and conditioning circuitry, and wherein the output is coupled to the output power port; and output filter circuitry, wherein the output of the first amplifier is coupled to the output power port via the output filter circuitry, and wherein the output of the second amplifier is coupled to the output power port via the output filter circuitry.

Some such aspects operate where the first amplifier is a main amplifier configured to provide linear amplification. Some such aspects operate where the control input configures the power state for the second amplifier by switching the second amplifier between an on state and an off state. Some such aspects operate where the second amplifier is a peaking amplifier.

Some such aspects operate where the second amplifier configured to operate in a saturation mode during the on state. Some such aspects operate where the control input configures the power state based on a current operating mode selected from a plurality of operating modes. Some such aspects operate where the plurality of operating modes includes a high power mode and a low power mode. Some such aspects operate where the control input is further based on one or more of a radio access technology (RAT) configuration, a peak-to-average power ratio value of a radio frequency (RF) signal, a bandwidth of the RF signal.

Some such aspects further include feedback circuitry coupled between the sensing and conditioning circuitry and the control input of the second amplifier, wherein the feedback circuitry provides a feedback signal from the sensing and conditioning circuitry to the control input to adjust a match between a power demand of a power amplifier coupled to the output power port and a voltage provided by the switcher circuitry, the first amplifier, and the second amplifier at the output power port.

Some such aspects further include a first sense element coupled between the output of the first amplifier and the input of the sensing and conditioning circuitry; and a second sense element coupled between the output of the second amplifier and a second input of the sensing and conditioning circuitry.

Some such aspects further include a sense element having an input and an output, wherein the input is coupled to the output of the first amplifier and the output of the second amplifier, and wherein the output is coupled to the input of the sensing and conditioning circuitry.

Some such aspects further operate where the output filter circuitry comprises first filter circuitry coupled between the output of the first amplifier and the output power port; wherein the output filter circuitry further comprises second filter circuitry different from the first filter circuitry, wherein the second filter circuitry is coupled between the output of the second amplifier and the output power port.

Some such aspects further operate where the first amplifier is a class-AB amplifier, and wherein the second amplifier is a class-C amplifier, where the first amplifier is a linear amplifier or where the second amplifier is a switching amplifier.

Some such aspects further operate where the input interface circuit is configured to receive a digital envelope signal at the envelope signal input port; wherein the input interface circuit is configured to output a first tracking signal at the first output based on a set of least significant bits of the digital envelope signal; and wherein the input interface circuit is configured to output a second tracking signal based on one or more most significant bits of the digital envelope signal.

In some aspects, the apparatuses described above can function in a system that includes a mobile device with a camera for capturing one or more pictures. In some aspects, the apparatuses described above can include a display screen for displaying one or more images or interface displays. In some aspects, additional wireless communication circuitry is provided. The summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
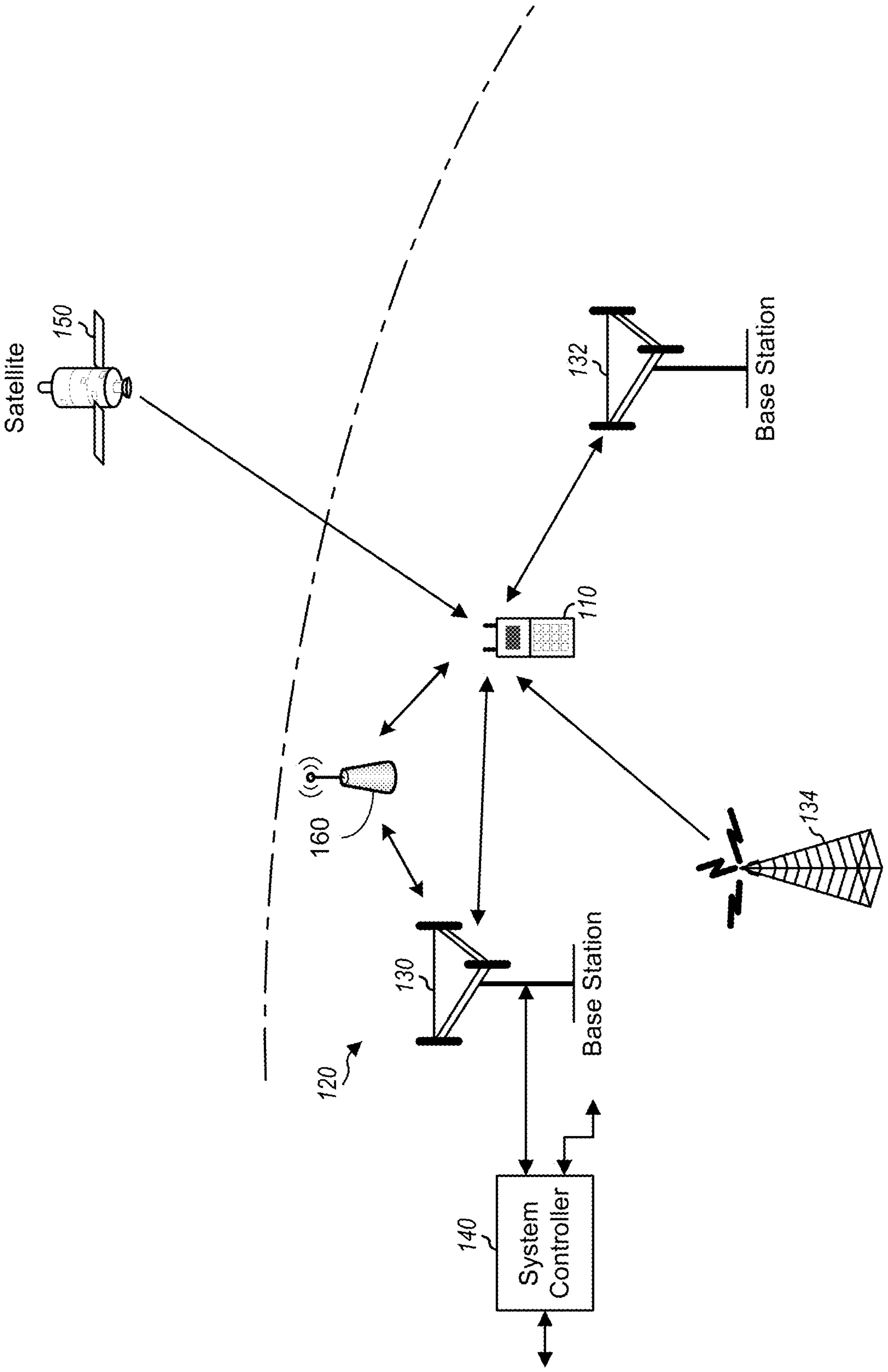
FIG. 1 is a diagram showing a wireless communication system communicating with a wireless device that can be implemented according to aspects described herein.

The detailed description set forth below in connection with the appended drawings is intended as a description of example aspects and implementations and is not intended to represent the only implementations in which the invention may be practiced. The detailed description includes specific details for the purpose of providing a thorough understanding of the example aspects and implementations. In some instances, some devices are shown in block diagram form. Drawing elements that are common among the following figures may be identified using the same reference numerals.

The progression of wireless communication infrastructure, such as for Third Generation Partnership Project (3GPP) fifth generation (5G) millimeter wavelength (mmW) systems, involves increasing importance of the radio frequency (RF) front end (RFFE) module. For example, 5G standards for cellular communications involve increasing complexity of frequency combinations and communication throughput options. Power amplifiers to enable RFFE operation consume significant amounts of power in an environment where, particularly for portable systems, power dissipation and power efficiency are important operating characteristics.

Aspects described herein include improved envelope tracking systems for wireless transmit communications, which are used to match a voltage headroom or a voltage available to the transmit power amplifier in an RFFE to the needed power identified by the envelope tracking. Aspects described herein further improve the operation of RFFE modules by using multiple amplifiers in the envelope tracking and power supply system that supports the power amplifier in an RFFE transmit chain. In particular, power efficiency is increased and unnecessary power dissipation is reduced by the use of multiple envelope tracking system amplifiers that support different operating conditions, and limit oversupply of power the transmit power amplifier that corresponds to excess power dissipation and associated thermal dissipation.

Further details regarding aspects described herein are provided with respect to the figures below.

FIG. 1 is a diagram showing a wireless device 110 communicating with a wireless communication system 120. In accordance with aspects described herein, the wireless device can include electronic devices with wireless communication capabilities enabled by RFFE modules along with other wireless communication elements. Devices within the system 120 can use envelope power tracking and power amplifier support to improve power efficiency of devices such as the wireless communication device operating in the communication system 120.

The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

Communication elements of the wireless device 110 for implementing mmW and non-mmW communications in accordance with any such communication standards can be supported by various designs of transceivers using a chained signal routing. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1×, EVDO, TD-SCDMA, GSM, 802.11, 5G, etc.

The wireless communication system 120 may also include a wireless device 160. In an exemplary embodiment, the wireless device 160 may be a wireless access point, or another wireless communication device that comprises, or comprises part of a wireless local area network (WLAN). In an exemplary embodiment, the wireless device 110 may be configured as a customer premises equipment (CPE), which may be in communication with a base station 130 and another wireless device 110, or other devices in the wireless communication system 120. In some embodiments, the CPE may be configured to communicate with the wireless device 160 using WAN signaling and to interface with the base station 130 based on such communication instead of the wireless device 160 directly communicating with the base station 130. In exemplary embodiments where the wireless device 160 is configured to communicate using WLAN signaling, a WLAN signal may include WiFi, or other communication signals.

Figure 2:
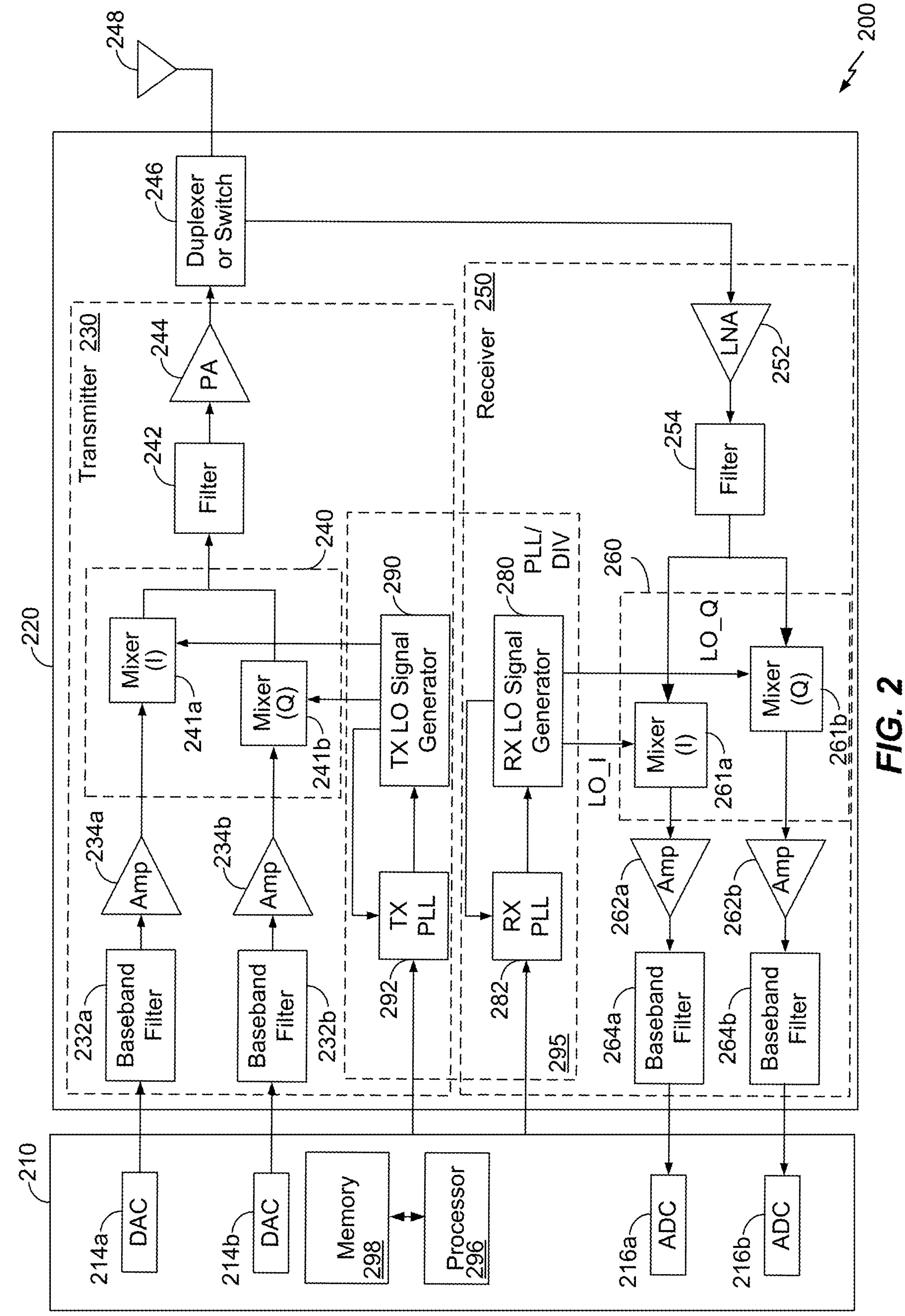
FIG. 2 is a block diagram showing portions of a wireless device in which aspects the present disclosure may be implemented.

FIG. 2 is a block diagram showing a wireless device 200 in which aspects of the present disclosure may be implemented. In particular, systems that supply power to a power amplifier (PA) 244 can include envelope tracking as described in more detail below. The wireless device 200 may, for example, be an embodiment of the devices (e.g., the base station 130 or 132, the wireless device 110 or 160, etc.) illustrated in FIG. 1. The circuitry described may be circuitry supporting wireless communications. In some examples, the wireless device 200 (or any of the devices described and/or illustrated hereinafter) may be an example of any of the devices illustrated in FIG. 1 or any other device described herein.

FIG. 2 shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2. Furthermore, other circuit blocks not shown in FIG. 2 may also be used to condition the signals in the transmitter 230 and receiver 250. Unless otherwise noted, any signal in FIG. 2, or any other figure in the drawings, may be either single-ended or differential. Some circuit blocks in FIG. 2 may also be omitted.

In the example shown in FIG. 2, wireless device 200 generally comprises the transceiver 220 and a data processor 210. The data processor 210 may include a processor 296 operatively coupled to a memory 298. The memory 298 may be configured to store data and program codes, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214*a* and 214*b* for converting digital signals generated by the data processor 210 into the I and Q analog output signals, e.g., I and Q output currents, for further processing. In other embodiments, the DACs 214*a* and 214*b* are included in the transceiver 220 and the data processor 210 provides data (e.g., for I and Q) to the transceiver 220 digitally.

Within the transmitter 230, baseband (e.g., lowpass) filters 232*a* and 232*b* filter the I and Q analog transmit signals, respectively, to remove undesired images caused by the prior digital-to-analog conversion. Amplifiers (Amp) 234*a* and 234*b* amplify the signals from the baseband filters 232*a* and 232*b*, respectively, and provide I and Q baseband signals. An upconverter 240 having upconversion mixers 241*a* and 241*b* upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. The power amplifier 244 amplifies the signal from filter 242 to obtain the desired output power level and provides a transmit RF signal. The transmit RF signal is routed through a duplexer or switch 246 and transmitted via an antennas 248. While examples discussed herein utilize I and Q signals, those of skill in the art will understand that components of the transceiver may be configured to utilize polar modulation.

In the receive path, the antennas 248 receives communication signals and provides a received RF signal, which is routed through duplexer or switch 246 and provided to a low noise amplifier (LNA) 252. The switch 246 is designed to operate with a specific RX-to-TX duplexer frequency separation, such that RX signals are isolated from TX signals. The received RF signal is amplified by LNA 252 and filtered by a filter 254 to obtain a desired RF input signal. Downconversion mixers 261*a* and 261*b* in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262*a* and 262*b* and further filtered by baseband (e.g., lowpass) filters 264*a* and 264*b* to obtain I and Q analog input signals, which are provided to data processor 210. In the exemplary embodiment shown, the data processor 210 includes analog-to-digital-converters (ADC's) 216*a* and 216*b* for converting the analog input signals into digital signals to be further processed by the data processor 210. In some embodiments, the ADCs 216*a* and 216*b* are included in the transceiver 220 and provide data to the data processor 210 digitally.

In FIG. 2, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280. the PLL 292 and the PLL 282 are part of shared PLL circuitry and LO generation 295 which can be shared between TX and RX sides of the device 200

Certain components of the transceiver 220 are functionally illustrated in FIG. 2, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the switch 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In some aspects using a super-heterodyne architecture, the power amplifier 244, and the LNA 252 (and filter 242 and/or 254 in some examples) may be implemented separately from other components in the transmitter 230 and receiver 250. While wireless device 200 describes one example of a device, it will be apparent that aspects described herein can be implemented in other architectures (e.g., super-heterodyne architectures) power envelope tracking systems described are not limited to power amplifiers in architectures such as the architecture in the example of FIG. 2.

Figure 3A:
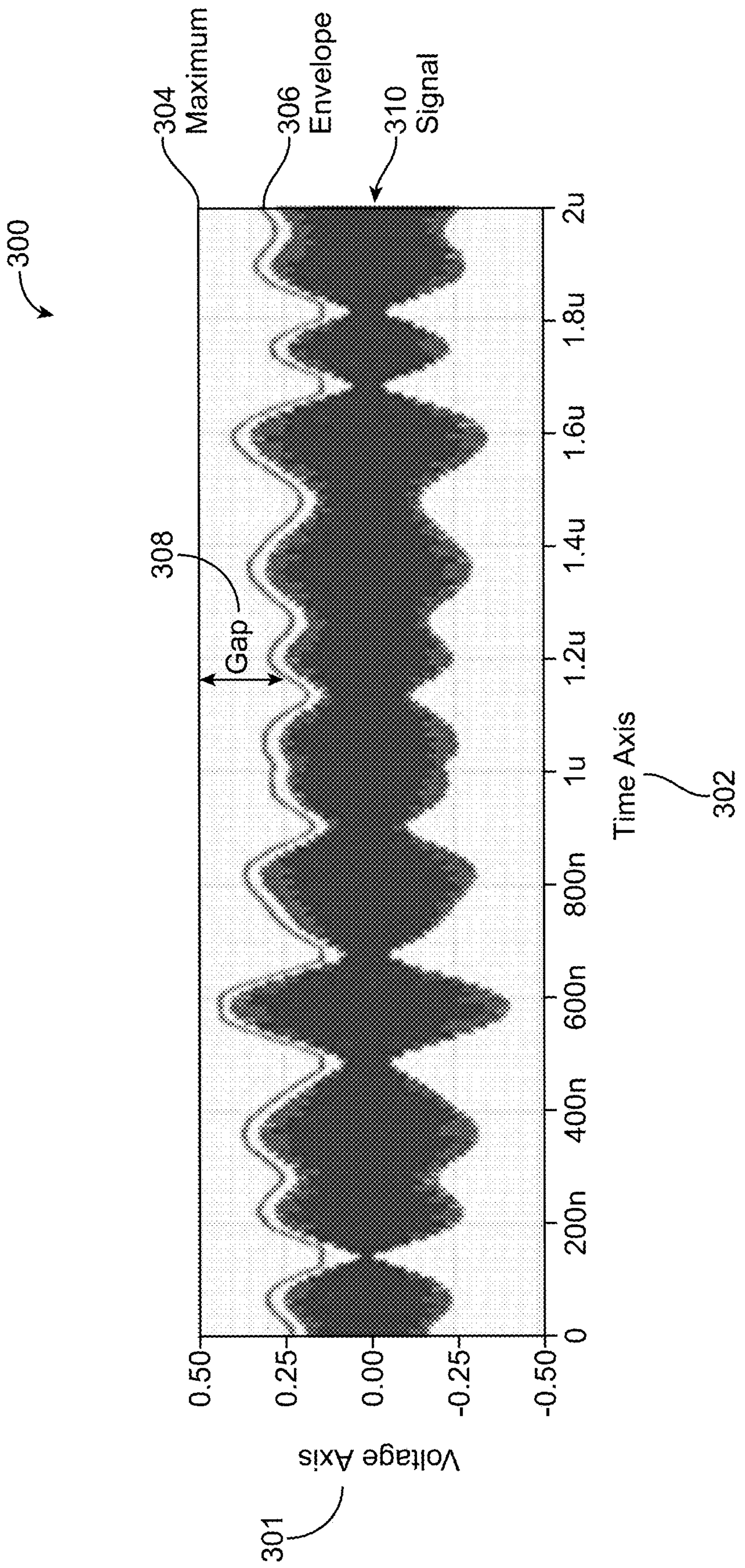
FIG. 3A is a chart illustrating power envelope tracking for an RFFE module, in accordance with aspects described herein.

FIG. 3A is a chart 300 illustrating power envelope 306 tracking for an RFFE module, in accordance with aspects described herein. As described above, RFFE modules are RFFE modules are wireless communication apparatuses that power wireless transmit signals, and can also include elements (e.g., filters, etc.) to manage reception of wireless signals from an antenna. As part of the powering of wireless transmit signals, an RFFE module can include a power amplifier, and can further include either power management circuitry in accordance with aspects described herein, or connections to a power management integrated circuit (PMIC) used to manage the RFFE power consumption and power consumption of other elements of an apparatus. As illustrated by power amplifier 244 of FIG. 3A, wireless communication devices include amplification to control output power on an antenna (e.g., the antenna 248). The actual power provided at the antenna as part of a transmission can vary widely based on operating conditions and the particular application. The power supply for such an output power amplifier can be a significant source of wasted power, particularly when a current transmit power does not match the power made available by systems supplying power to the amplifier.

The chart 300 includes a time axis 302 and a voltage axis 301. The chart 300 illustrates example operating conditions for such an output power amplifier (e.g., the power amplifier 244), with a maximum voltage 304 supported by a system, the signal 310 voltage used by the power amplifier at a given point in time to support the transmission signal, and a voltage envelope 306 illustrating the voltage used by the signal 310 voltage to support signal performance. The gap 308 illustrates the difference between the maximum voltage 304 and the voltage envelope 306 associated with the voltage used by a power amplifier at a given point in time. The envelope 306 can be considered the voltage needed to support adequate signal performance at a given point in time. If the system provides less voltage to an amplifier than is needed for the signal 310 voltage, the integrity of the signal is damaged, and will result in corruption of transmitted data.

As the provided voltage increases, power dissipation increases, regardless of the voltage actually used by the power amplifier for a transmission signal. The gap 308 represents excess power usage associated with a device providing a high voltage than is needed to support a transmission signal at any given time. Given the importance of power efficiency for wireless communication devices, particularly mobile devices that operate with a limited battery, limiting such a gap and associated excess power dissipation is an important design goal.

Figure 3B:
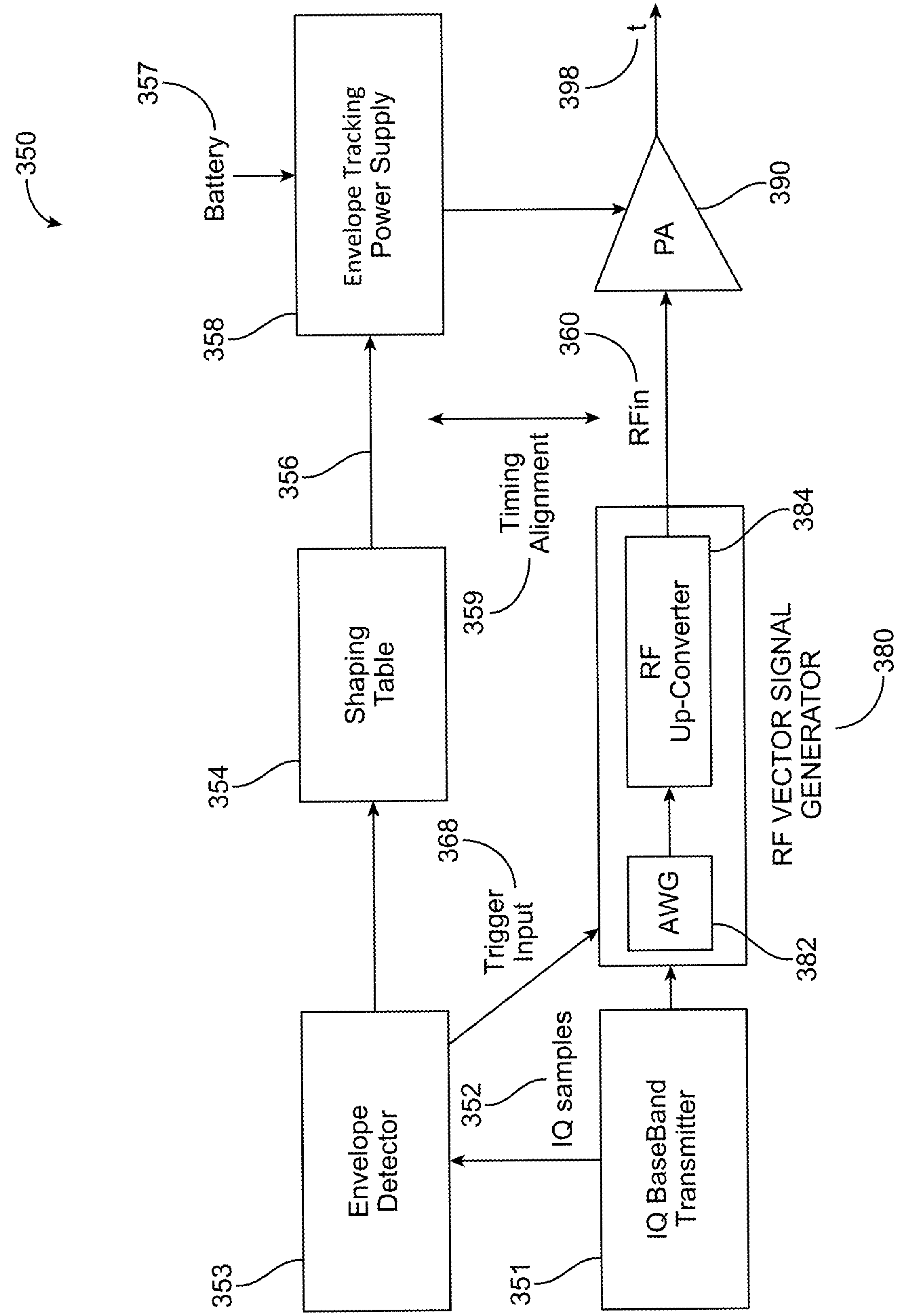
FIG. 3B is a high level block diagram of a system for power envelope tracking for an RFFE module, in accordance with aspects described herein.

FIG. 3B is a high-level block diagram of a system 350 for power envelope tracking for an RFFE module, in accordance with aspects described herein. The system 350 includes a power amplifier which can be similar to the power amplifier 244 described above, with an envelope tracking power supply 358 that operates to limit excess power dissipation associated with a gap such as the gap 308 of FIG. 3B above.

To perform envelope tracking and match the voltage provided to the power amplifier 390 to the voltage used by a signal at a given time, a baseband transmitter 351 provides signal samples 352 to an envelope detector 353. The envelope detector 353 outputs an envelope value to a shaping table 354 that outputs an envelope signal 356. The envelope signal 356 is input to the power supply 358 and used with power from a battery 357 to match the voltage associated with the envelope of the transmission signal to the voltage provided to the power amplifier 390.

As the envelope signal 356 is provided to the power supply 358, a trigger input 368 from the envelope detector 353 is used to align a timing of the analog envelope signal and the voltage provided from the power supply 358 to a RF input 360 signal provided to the power amplifier 390 and an associated transmission signal at RF output 398. The RF input 360 is generated by an RF vector signal generator 380, which includes a waveform generator 382 and an RF upconverter 384. The waveform generator 382 generates a low frequency version the waveform to be transmitted from samples provided by the baseband transmitter 351. In other implementations, a transmitter of the wireless device 200 or another such apparatus can generate the waveform. The low frequency waveform is upconverted to the transmission frequencies by the RF upconverter 384 and provided to the RF input 360 for amplification by the power amplifier 390.

The voltage provided to the PA 390 by the envelope tracking power supply 358 can thus match the envelope 306 illustrated in FIG. 3A. The timing alignment 359 between the envelope signal 356 and the RF input 360 prevents the envelope 306 from being out of alignment with the signal 310, which would result in signal clipping and errors at the RF output 398 (e.g., if the envelope 306 was shifted left or right while the signal 310 maintained position). Additional details related to implementations of the timing alignment 359 and the envelope tracking power supply 358 in accordance with aspects described herein are provided below.

Figure 4:
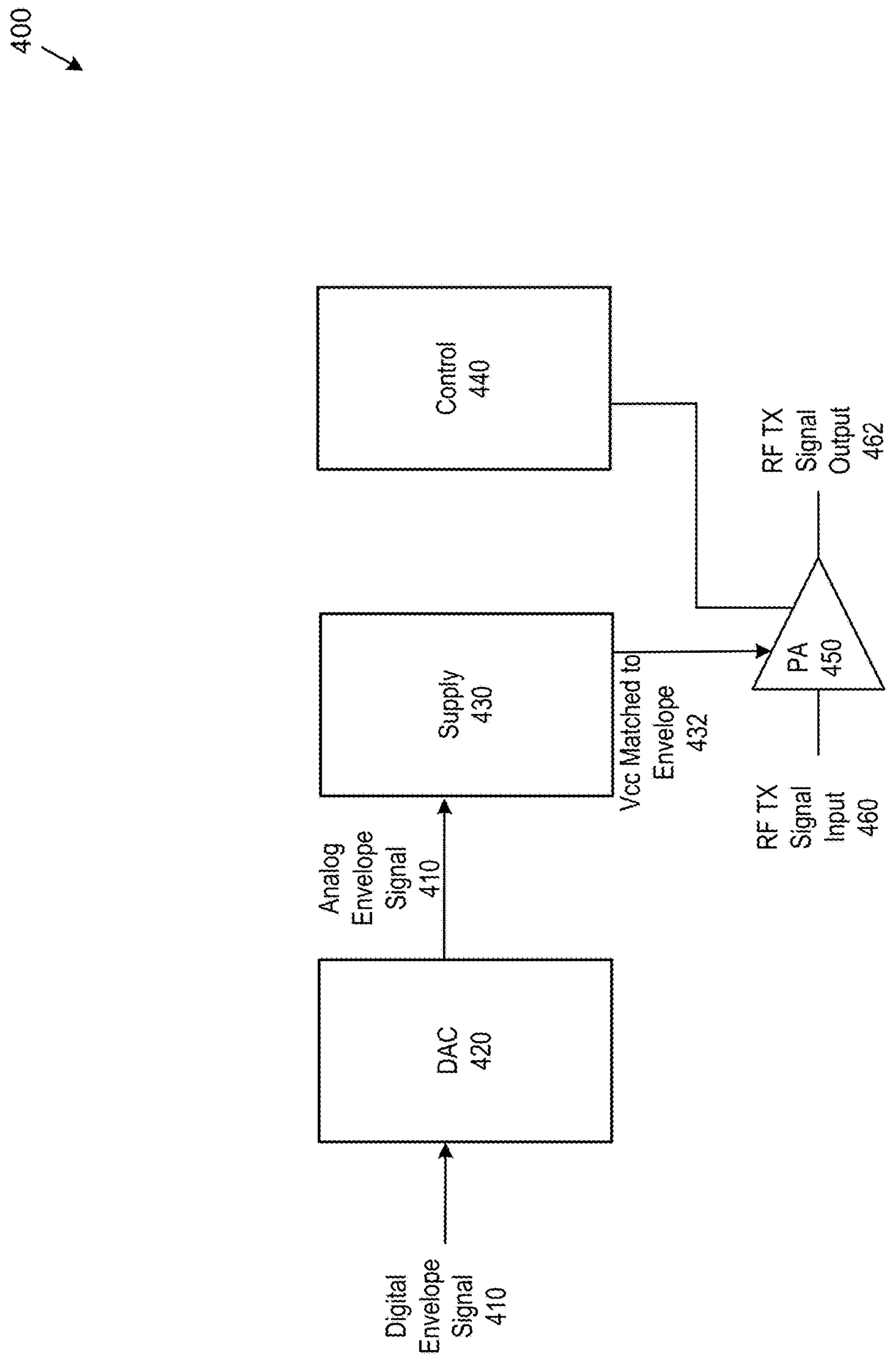
FIG. 4 is a block diagram showing aspects of a system for using power envelope tracking to control the power supplied to an RFFE power amplifier, in accordance with aspects described herein.

FIG. 4 is a block diagram showing aspects of a system 400 for using power envelope tracking to control the power supplied to an RFFE power amplifier, in accordance with aspects described herein. The system 400 can be an implementation of the envelope tracking power supply 358 of FIG. 3B, where the envelope signal 356 is provided to the envelope tracking power supply 358 as a digital envelope signal 410. In the system 400, the digital envelope signal 410 is provided to a digital to analog converter (DAC) 420, which outputs an analog envelope signal 410. The analog envelope signal 410 is provided to a supply source 430, which outputs a voltage VCC 432 which is matched with an envelope of the RF signal provided at an RF transmission signal input 460, and synchronized and to have the VCC provided to a power amplifier 450 matching a voltage needed at the RF transmission signal output 462.

During operation, depending on the dynamic range or operating conditions present in the signal provided at the input 460, control circuitry 440 can alter operational settings of the power amplifier 450. Similarly, the supply source 430 can, in various implementations as described below, include various structures for responding to the specifics of a particular transmission signal. For example, in one implementation, the analog envelope signal 410 can be provided to an amplifier that outputs a signal tracking dynamic aspects of the voltage 432, with a sensing circuit coupled to an output of the amplifier to track direct current aspects of the voltage 432. A switcher can be used to set the direct current level of the voltage 432, and the output of the switcher and the amplifier can be combined to provide the voltage 432 at a level that tracks the envelope of the signal being amplified by the power amplifier 450. In various implementations, additional circuitry can be included in the system 400, such as additional control circuitry for responding to device operating conditions, protection circuitry, signal interference suppression circuitry to minimize propagation of spurious signals through the voltage supply, or other such circuitry.

In some implementations, the control circuitry 440 can include a boost converter or other such elements can be used to manage voltages in accordance with aspects described herein when a battery level is low. Aspects described herein, while not specifically illustrated with such boost converter elements, can include additional battery level and power management features in combination with aspects described herein to manage power use at all stages of a battery supply level for an apparatus including aspects described herein.

Figure 5:
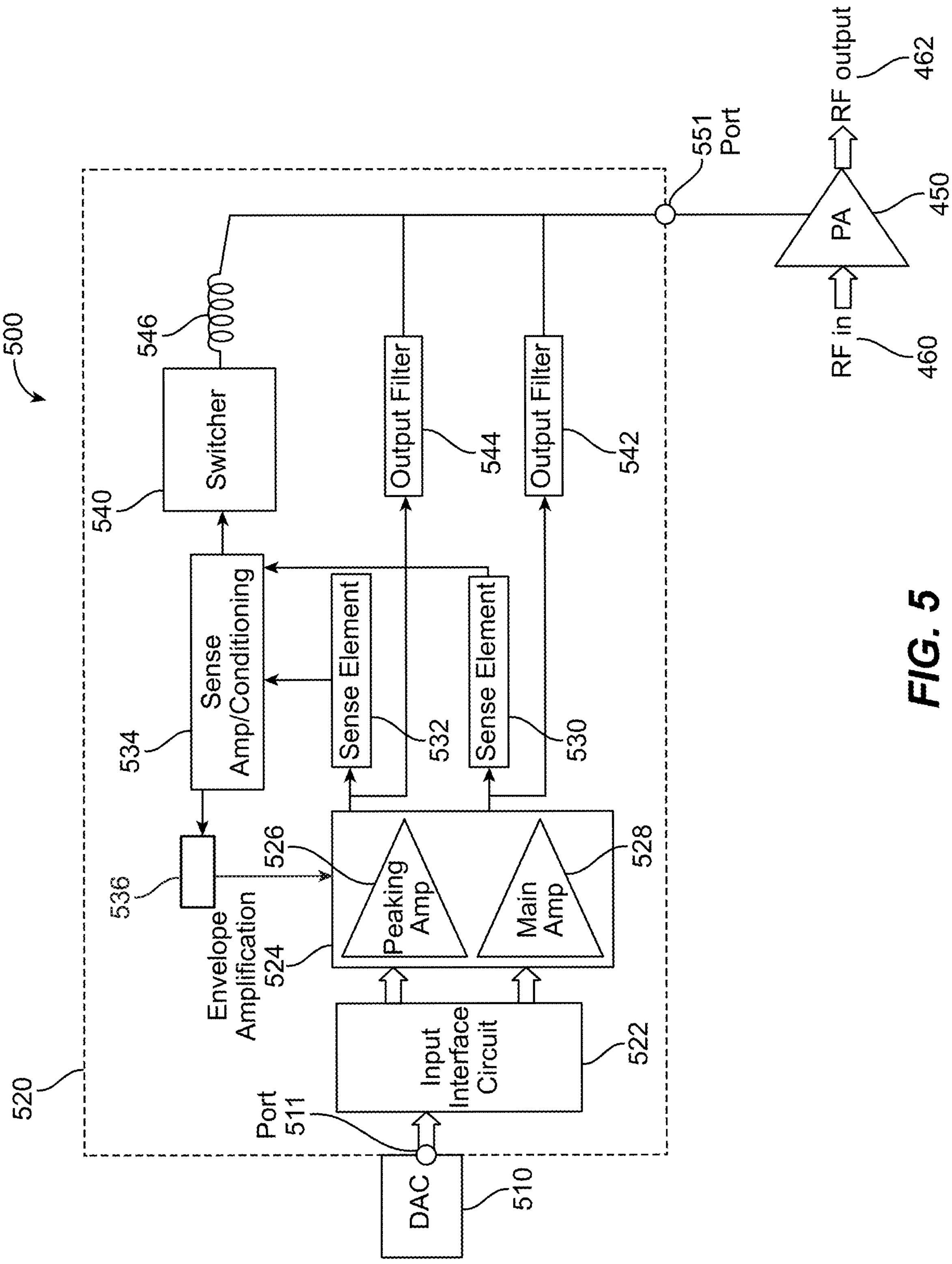
FIG. 5 is a block diagram showing aspects of a system for using power envelope tracking to control the power supplied to an RFFE power amplifier, in accordance with aspects described herein.

FIG. 5 is a block diagram showing aspects of a system 500 for using power envelope tracking to control the power supplied to an RFFE power amplifier 450, in accordance with aspects described herein. In the illustrated example of FIG. 5, the RF input 460, the RF output 462, and the power amplifier 450 are the same as illustrated in FIG. 4. Envelope tracking power supply 520 illustrates an implementation of the envelope tracking power supply 358 or the system 400, with the digital to analog circuit 510 outside the envelope tracking power supply 520 (e.g., compared with the DAC 420 inclusion in the system 400).

The envelope tracking power supply 520 includes at least two amplifiers as part of amplification circuitry 524. In the illustrated example of FIG. 5, the amplification circuitry 524 includes a first amplifier 528 and a second amplifier 526. As described above, the DAC 510 can receive a digital envelope signal, and provide an analog envelope signal to the envelope tracking power supply 520 at an input port 511. The input port 511 is coupled to an input interface circuit 522. The input interface circuit provides both a tracking signal matching the analog envelope signal to the amplification circuitry 524, as well as a control input.

The first amplifier 528 can, in some implementations, be a main amplifier that tracks the analog envelope signal by itself under standard or low demand operating conditions. The second amplifier 526 can be a peaking amplifier that is off during low demand or standard operating conditions, but that turns on to support peak voltage conditions, high frequency envelope changes, or other operating conditions that are beyond the response capacity of the first amplifier 528 operating alone. The second amplifier can be set to an off condition when the standard operating conditions are present and turned on when needed by a control signal from amplifier control circuitry 536. In some implementations, the control signal can be generated by the amplifier control circuitry 536 integrated with a modem based on characteristics of the analog envelope signal provided the input port 511 via the DAC 510. In other implementations, the amplifier control circuitry 536 can be configured as feedback circuitry that receives a signal from conditioning circuitry 534. In other implementations, the input interface circuit 522 can integrate control circuitry 536 to provide the control inputs for the second amplifier 526. In any case, processing circuitry an provide a control signal indicating conditions for setting the second amplifier 526 in an on or an off state based on characteristics of the analog envelope signal.

In some implementations, a control signal from the amplifier control circuitry is a binary on/off signal. In some implementations, other non-binary control signals can be used. In some implementations, multiple modes of peaking amplifier operation can be used, such as low power modes, high power modes, or other such modes. In such implementations, a slope of an RF signal, a radio access technology (RAT) configuration, a bandwidth of the RF signal, a peak-to-average power ratio (PAPR) of a signal or other values can be used in selecting an operating mode, and/or in determining the structure of a control signal provided by the control circuitry managing the peaking amplifier 526.

The first amplifier 528 has an input and an output with the input coupled to the tracking signal from the input interface circuit 522, and the output providing a voltage signal to an output filter 542. During operating conditions where the second amplifier 526 is in the off state, the output of the first amplifier 528 provides a voltage output to the output filter 542, which can filter any spurious signals or reduce noise from the output of the first amplifier 528. The voltage signal output from the output filter 542 is then provided as the dynamic portion of the VCC voltage provided to the power amplifier 450 via an output port 551 of the envelope tracking power supply 520. The output of the first amplifier 528 is additionally tapped by a connection to a sensing element 530. The sensing element 530 provides a value tracking the output signal from the first amplifier 528 to sensing and conditioning circuitry 534. The sensing and conditioning circuitry 534 can provide feedback via amplifier control circuitry 536 to the envelope amplification circuitry 524 to adjust the control settings, and can also provide a direct current (DC) control signal tracking a direct current portion of the target VCC value to be output at the output port 551. The sensing and conditioning circuitry can additionally provide an input to the switcher 540 to enhance DC control. The input from the sensing and conditioning circuitry 534 to the switcher 540 is combined with an VCC level signal from the modem to manage DC control tracking. The two signals are input to the switcher 540, which outputs a DC portion of the VCC value via element 546. The element 546 can, in some implementations, be an inductor configured to filter noise from the DC portion of the VCC value. In other implementations, more complex filtering circuitry can be used at the output of the switcher 540. The combined output of the switcher 540 and the output filter 542 provide a VCC voltage value at the output port 551 that tracks the voltage used by the power amplifier 450 to create a transmission RF signal at the RF output 462 to be transmitted via an antenna. As described above, adjusting the VCC value for the power amplifier 450 reduces unnecessary power dissipation which occurs when the VCC value provided to the power amplifier 450 is significantly more than what is needed for the transmission signal.

As described above, when the second amplifier 526 is off, the output from the second amplifier does not contribute to the VCC value provided to the output port 551 and to the power amplifier 450. When the amplifier circuitry 536 determines that the first amplifier 528 is not able to track the envelope signal to provide an acceptable voltage at the output port 551, the second amplifier 526 is set to an on state, and operates similar to the output path from the first amplifier 528. A peaking input signal is provided to an input of the second amplifier, and a peaking voltage signal is output from an output of the second amplifier 526. The peaking voltage signal is filtered through an output filter 544, and combined with the voltage signals from the switcher 540 and the output filter 542 (e.g., from the first amplifier 528). The peaking voltage signal, when combined with the other signals, can provide higher performance responsiveness and/or power when compared to operation without the peaking voltage signal from the second amplifier 526. Similarly, a sensing element 532 tap at the signal from the output of the second amplifier 526 is provided to the circuitry 534, and can update or modify both the DC control signal provided to the switcher 540 and a feedback signal processed via the feedback circuitry implemented as amplifier control circuitry 536 based on characteristics of the peaking voltage signal from the output of the second amplifier 526.

Additionally, the configuration option to set the second amplifier 526 to an off state conserves power, such that power consumed by the second amplifier 526 is less than power consumed by amplification circuitry 524 with a single linear amplifier combined with any excess power dissipation caused by additional voltage headroom (e.g., a larger gap such as the gap 308) provided to the power amplifier 450 via the output port 551.

As described above, in various implementations, control circuitry 536 can be used to manage the addition of the second amplifier 526 (e.g., the peaking amplifier) into the circuitry that contributes to the voltage provided the power amplifier 450 can be controlled in different ways. In some implementations, the input interface circuit 522 includes control circuitry to monitor the most significant bits provided to the DAC 510 using an input of the digital envelope signal. When the most significant bits are active (e.g., indicating a high voltage value), the second amplifier 526 can be turned on. In still further implementations, a most significant bit of the digital envelope signal can be used directly to turn on the peaking second amplifier 526, without additional processing circuitry. In some implementations, a control signal can be provided from modem circuitry based on envelope tracking data synchronized to the control of the second amplifier 526 to determine when the second amplifier is turned on or off.

In some implementations, the control circuitry 536 is implemented with a feedback connection directly from the sense amplification and conditioning circuitry 534. Such a feedback signal from the conditioning circuitry 534 has a benefit of being closely coupled to the voltage signal. At high frequency operation, such a close feedback connection can improve the tracking of the envelope to the transmission signal, limit errors or noise in the difference between the envelope and the transmission signal, and allow a smaller gap (e.g., the gap 308) with an associated reduction in dissipation power for the gap between the voltage provided to the power amplifier and the voltage used by the power amplifier. With feedback directly from conditioning circuitry, current, voltage, or power coming directly from either the first amplifier 528 or the second amplifier 526 can be directly measured and compared with the target envelope match. Such feedback can be used in directly determining control set points where amplifiers operate (e.g., where the second amplifier is turned on and off), and to directly correct mismatches between expected output(s) and voltage values at the output port 551. As described above, in some implementations, a control signal from the amplifier control circuitry is a binary on/off signal. In some implementations, other non-binary control signals can be used. In some implementations, multiple modes of peaking amplifier operation can be used, such as low power modes, high power modes, or other such modes. In such implementations, a slope of an RF signal or a peak-to-average power ratio of a signal can be used in selecting an operating mode, and/or in determining the structure of a control signal provided by the control circuitry managing the peaking amplifier 526.

In some implementations, the use of the second amplifier 526 in parallel with the first amplifier 528 allows different structures for different applications. In some implementations the first amplifier 528 and the second amplifier 526 have a similar or same interfaces with the input interface circuit 522 duplicated for the two amplifiers. In other implementations as discussed below for FIG. 6, different amplifiers are used and can be configured based on the particular characteristics of each amplifier. For example, in some implementations, rather than using a control signal to turn the second amplifier 526 on and off, in some implementations, the input interface circuit 522 can be provided two separate signals, one derived from the most significant bits of the digital envelope signal, and one derived from the least significant bits of the digital envelope signal. The signal derived from the most significant bits can drive the second amplifier 526, and the signal derived from the least significant bits can drive the first amplifier 528. In other implementations, the modem can provide separate signals for different amplifiers of the amplification circuitry 524.

In some such implementations, the second amplifier 526 can have lower linearity, since it operates at higher output ranges, and the first amplifier 528 may have greater linearity for operating at lower output ranges.

Figure 6:
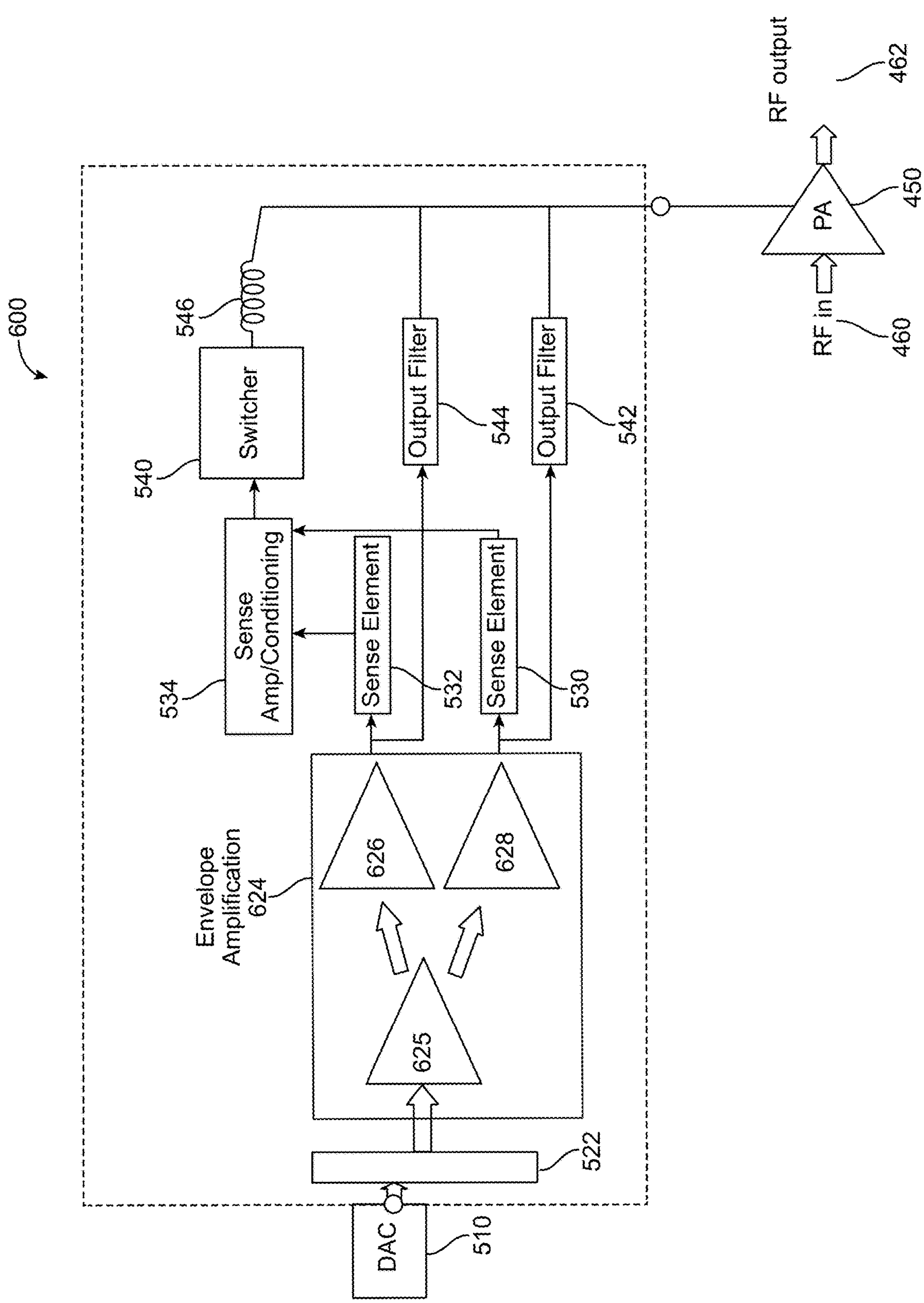
FIG. 6 is a block diagram showing aspects of a system for using power envelope tracking to control the power supplied to an RFFE power amplifier, in accordance with aspects described herein.

FIG. 6 is a block diagram showing aspects of a system 600 for using power envelope tracking to control the power supplied to an RFFE power amplifier, in accordance with aspects described herein. The system 600 includes the same DAC 510 and power amplifier 450, as well as the same sensing, conditioning, filtering, and switching circuitry, but the envelope amplification circuitry 524 of FIG. 5 is replaced with a different envelope amplification circuitry 624 in FIG. 6. The envelope amplification circuitry 624 of FIG. 6 includes a common stage 625, and separate amplifiers 626 and 628 with independent control inputs. In some implementations, the common stage 625 can be removed, with the input interface circuit 522 providing separate signals to the separate amplifiers 626 and 628. In some implementations, the common stage 625 can be integrated with the input interface circuit 522 to provide smoothing or other interface integration between digital signals and analog signals output by the amplification circuitry 524.

In the implementation of FIG. 5, the input interface circuit 522 can operate as digital partitioning between the envelope signal provided to the envelope tracking power supply 520, and the amplification circuitry 524. In FIG. 6, the common stage 625 can function as an additional analog partitioning at the input of the amplification circuitry 624. In some configurations, amplifiers of amplification circuitry 624 are designed for multi-stage circuitry. Some such circuitry includes smoothing functions to manage filtering or interface aspects of the amplifiers to digital inputs. The common stage 625 can, in some implementations, provide signal performance benefits managing such smoothing of signals and managing the signal inputs to the separate amplifiers 626 and 628.

In some implementations, the amplifier 628 can be similar to the first amplifier 528 of FIG. 5, and the amplifier 626 can be similar to the second amplifier 526 of FIG. 5. In some implementations, the amplifier 628 can be a class-AB amplifier (e.g., an amplifier with greater linearity) and the second amplifier can be a class-C amplifier, providing design flexibility and component options while maintaining envelope tracking performance. In some implementations, the second amplifier 626 operating as a peaking amplifier can be a switch-mode amplifier such as a class-E, class-G, or class-H amplifier. Some such amplifiers can, for example, be used in a switching configuration, such as when the most significant bit or bits are used as a threshold or other bits are used with threshold circuitry to activate the second amplifier 626 operating as a threshold activated switching amplifier operating at saturation for high efficiency. In such an implementation, the first amplifier 628 can provide any needed linearity, with the second amplifier 626 only operating at saturation to provide a boost needed to achieve higher voltage levels at the output port 551 and the corresponding connection to the power amplifier 450.

Figure 7:
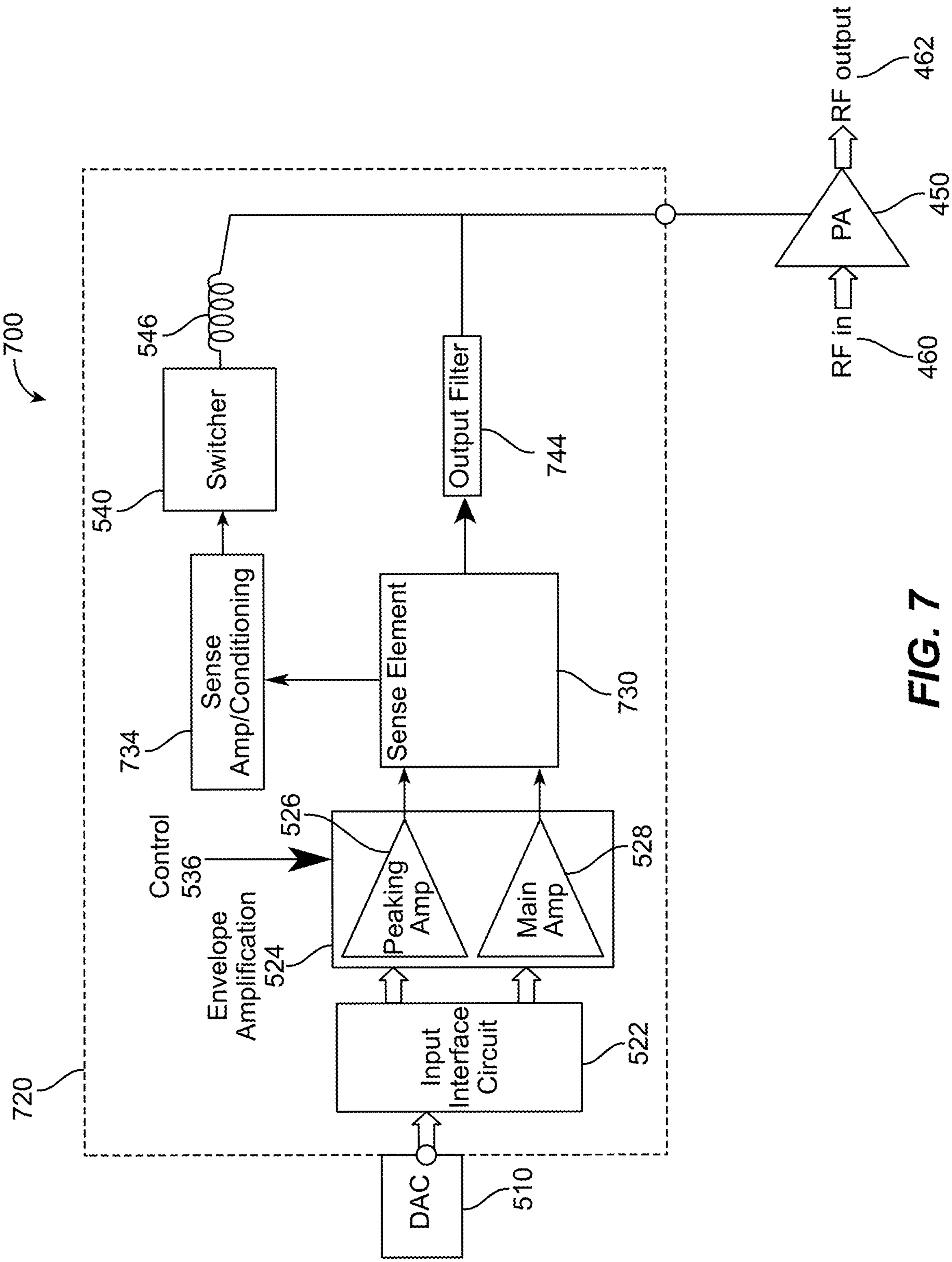
FIG. 7 is a block diagram showing aspects of a system for using power envelope tracking to control the power supplied to an RFFE power amplifier, in accordance with aspects described herein.

FIG. 7 is a block diagram showing aspects of a system 700 for using power envelope tracking to control the power supplied to an RFFE power amplifier, in accordance with aspects described herein. The system 700 includes the same DAC 510 and power amplifier 450, as but the separate sensing and filtering elements are combined into a shared sensing element 730 with a common output to an output filter 744 which provides the combined variable voltage signal at an output where it is combined with the low frequency (e.g., DC) voltage from the switcher 540. The combined sense element 730 can be used in environments with space or component level limitations for sense elements. In some implementations, the output filter 744 can be outside of an IC system used for the envelope tracking power supply 720. For example, in some implementations, the output filter 744 can be a capacitor which is on a supporting board coupled to the amplification circuitry 524.

In some implementations, the sensing element 730 can be a simple resistive element used to sense current and voltage and to turn the switcher 540 (e.g., a switching regulator to provide the DC and low frequency components of the envelope tracking voltage for the power amplifier 450). In various implementations, the output signal of amplification circuitry 524 is not used as an input to the conditioning circuitry 734, but a replica signal (e.g., from duplicate circuitry, which is not shown) is used to manage the switcher 540 and any feedback as a signal from the control circuitry 536, to avoid impacting the higher frequency voltage signal (e.g., portions of the signal not provided by the switcher 540). Such a system can additionally operate to separate the switcher 540 with switching energy from element 546 (e.g., an inductor) with energy that can cause problems if pushed into the power amplifier 450. The switcher 540 can, in many implementations, operate at high efficiency, but cannot (e.g., due to device limitations) provide accurate high frequency voltage signals and tracking. As frequency and power levels are low, the switcher 540 can provide the voltage to the power amplifier 450 at high efficiency. As frequency and power levels for the power amplifier 450 increase, the switcher is no longer able to meet the voltage tracking limits, and the power assistance of the amplifiers are used, at lower efficiency, to meet the voltage tracking at higher power and frequency levels. By pushing DC supply to the switcher 540, additional efficiency is enabled. As power demands on the linear assistance from the first amplifier increase, efficiency degrades, and the addition of the second amplifier as a peaking amplifier allows the first linear amplifier to operate in an efficient state, with the peaking amplifier operating efficiently for a different purpose of providing the peaking voltage efficiently, in addition to the DC voltage being provided efficiently by the switcher 540 (e.g., so the amplification circuitry including the linear amplifier does not need to inefficiently provide any DC power).

Figure 8:
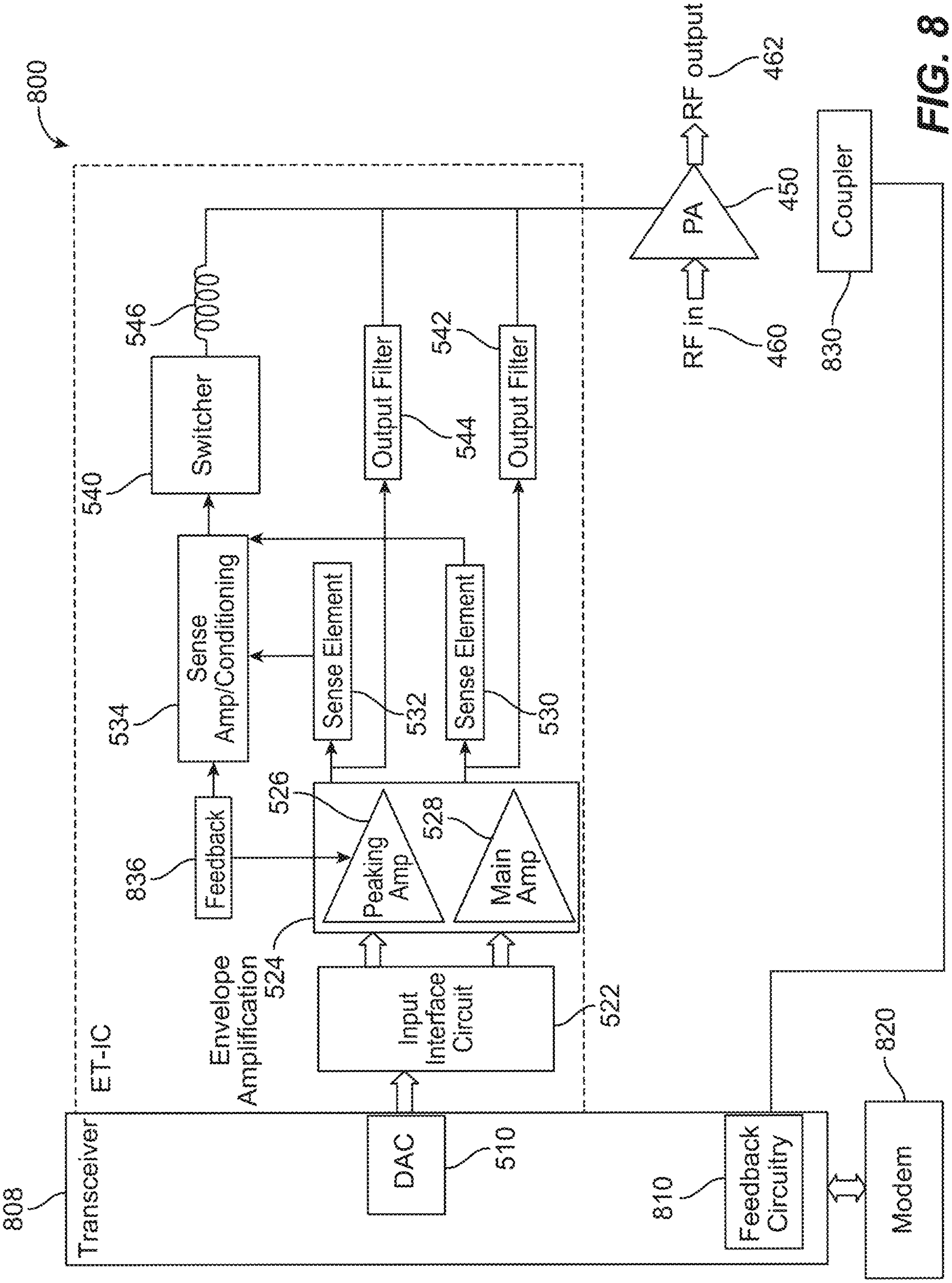
FIG. 8 is a block diagram showing aspects of a system for using power envelope tracking to control the power supplied to an RFFE power amplifier, in accordance with aspects described herein.

FIG. 8 is a block diagram showing aspects of a system 800 for using power envelope tracking to control the power supplied to an RFFE power amplifier, in accordance with aspects described herein. The system 800 includes the same DAC and envelope tracking as FIG. 5, but with direct feedback circuitry 836 from the conditioning circuitry 534 shown, and the additional system elements of transceiver 808, modem 820, and coupler 830. The coupler 830 can provide a feedback signal describing the operation of the power amplifier 450, which can be used as additional feedback to improve the envelope signal, and management of the control input to prevent the amplification circuitry of the envelope tracking power supply from wasting power with excess current into the power amplifier 450. The series feedback from the coupler 830 can allow the amplification circuitry to provide the voltage tracking the envelope with the current needed for the power amplifier 450 coming from a more efficient source in the form of the switcher 540 (e.g., as the PA appears as a high resistance, rather than a low resistance in the 10 ohm range which would require a large current to maintain the envelope tracking voltage). The coupler 830 can provide feedback via feedback circuitry 810 of the transceiver 808, coupled with controls from the modem, to provide a signal to the switcher 540 to efficiently provide the current needed for operation of the power amplifier 450 (e.g., matching the tracking envelope).

The various control and feedback loops, including the control of the amplification circuitry within the envelope tracking power supplies, and the feedback from the coupler 830 to the feedback circuitry 810, can be calibrated as follows in some implementations. With a given voltage envelope (e.g., 100 megahertz frequency at a low voltage level), the first (e.g., main) amplifier can be enabled and performance (e.g., envelope tracking performance) calculated. Then the second (e.g., peaking) amplifier can be enabled with the first amplifier disable, and then both can be enabled. Control circuitry within the modem, the circuitry, the input interface circuit, feedback circuitry 836, or any other such circuitry can use the performance information at a given frequency for an initial calibration. Such calibrations can be performed for frequency profiles used or expected for any communication band to set initial feedback settings. The feedback systems can then be adjusted during operation to manage performance during operation of an apparatus using any system described herein.

Figure 9:
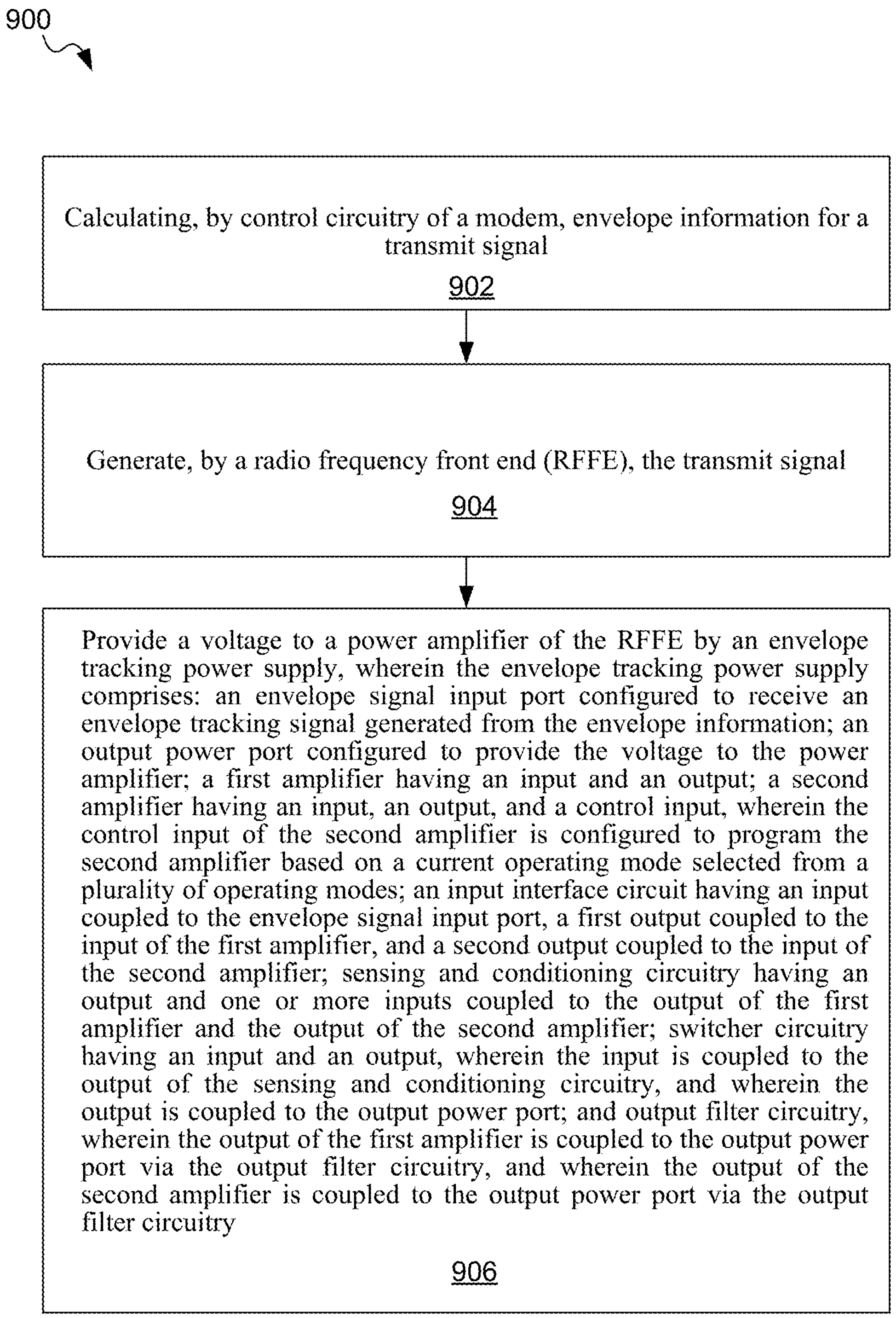
FIG. 9 is a flow diagram illustrating a method in accordance with aspects of the present disclosure.

FIG. 9 is a flow diagram describing an example of the operation of a method 900 for operation of a device including an envelope tracking power supply for a power amplifier. The blocks in the method 900 can be performed in or out of the order shown, and in some embodiments, can be performed at least in part in parallel.

At block 902 of method 900, the device (or a component thereof) may calculate (e.g., by control circuitry of a modem), envelope information for a transmit signal.

At block 904 of the method 900, the device or a component of the device may generate (e.g., by a radio frequency front end (RFFE)), the transmit signal.

At block 906 of the method 900, the device or a component of the device may provide a voltage to a power amplifier of the RFFE by an envelope tracking power supply. Such an envelope tracking power supply can be any envelope tracking power supply described herein. In one implementation, the envelope tracking power supply comprises: an envelope signal input port configured to receive an envelope tracking signal generated from the envelope information; an output power port configured to provide the voltage to the power amplifier; a first amplifier having an input and an output; a second amplifier having an input, an output, and a control input, wherein the control input of the second amplifier is configured to program the second amplifier based on a current operating mode selected from a plurality of operating modes; an input interface circuit having an input coupled to the envelope signal input port, a first output coupled to the input of the first amplifier, and a second output coupled to the input of the second amplifier; sensing and conditioning circuitry having an output and one or more inputs coupled to the output of the first amplifier and the output of the second amplifier; switcher circuitry having an input and an output, wherein the input is coupled to the output of the sensing and conditioning circuitry, and wherein the output is coupled to the output power port; and output filter circuitry, wherein the output of the first amplifier is coupled to the output power port via the output filter circuitry, and wherein the output of the second amplifier is coupled to the output power port via the output filter circuitry.

Figure 10:
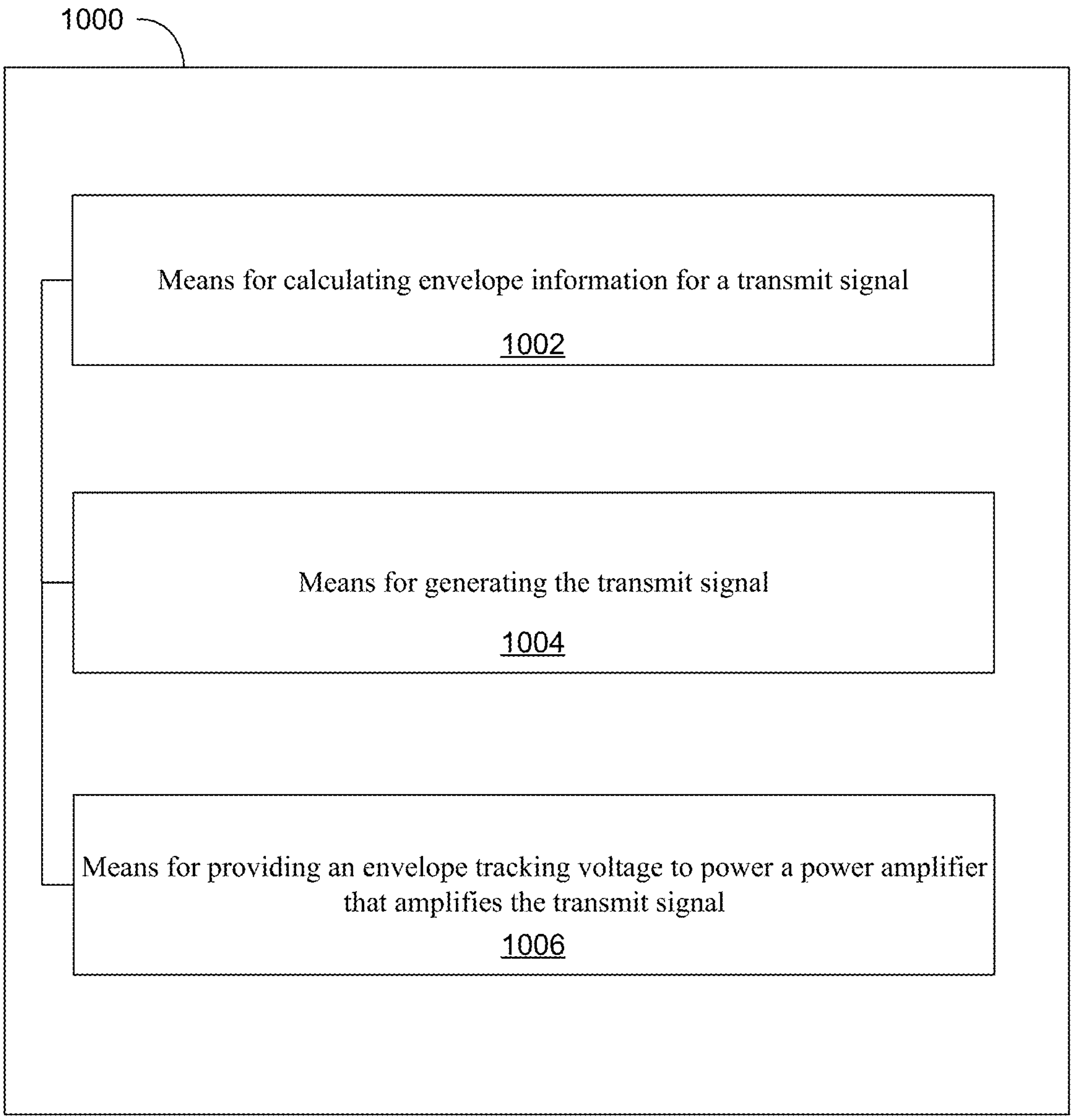
FIG. 10 is a functional block diagram of an apparatus including power envelope tracking to control the power supplied to an RFFE power amplifier in accordance with some aspects of the present disclosure.

FIG. 10 is a functional block diagram of an apparatus including an envelope tracking supply for a power amplifier as described herein. The apparatus 1000 comprises means 1002 for calculating envelope information for a transmit signal. In some aspects, the means 1002 is a modem, such as the modem 1218 of FIG. 12, or other such control or communication circuitry of a wireless communication apparatus described herein. The apparatus 1000 further comprises means 1004 for generating the transmit signal (e.g., used to determine the envelope information by the means 1002). The means 1004 can be circuitry of a transceiver such as the transceiver 1206 that provides a signal to an RFFE, elements of a transmitter 230, or other such elements of a wireless communication path as described herein. The apparatus 1000 comprises means 1006 for providing an envelope tracking voltage to power a power amplifier that amplifies the transmit signal. The means 1006 can be an envelope tracking power supply or elements of an envelope tracking power supply as described herein, such as the supply source 430, the envelope tracking power supply 520, the system 600, the system 700, the envelope tracking power supply 720, the system 800, or any such means described herein.

Figure 11:
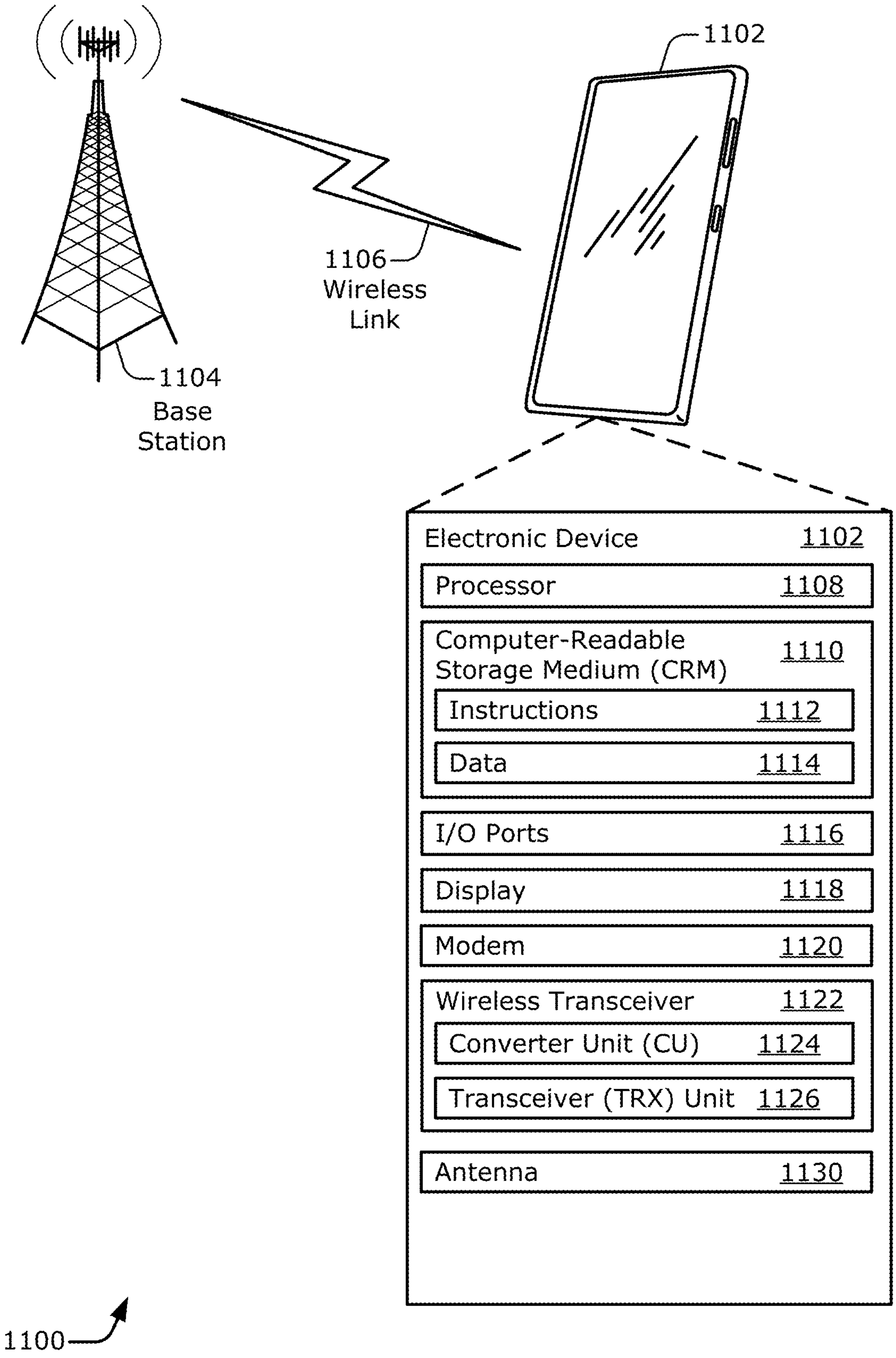
FIG. 11 is a diagram illustrating an environment that includes an electronic device and a base station that can be used with aspects of the present disclosure.

FIG. 11 is a diagram illustrating an exemplary environment 1100 that includes an electronic device 1102 and a base station 1104, each comprising a transceiver (e.g., wireless transceiver 1122 of the electronic device 1102) or a receiver having a receive path that can include an implementation of an envelope tracking power supply, in accordance with examples described herein. In the environment 1100, the electronic device 1102 communicates with a base station 1104 through a wireless communication link 1106 (wireless link 1106). In such an example, the electronic device 1102 is depicted as a smart phone. However, the electronic device 1102 may be implemented as any suitable computing or other electronic device, such as a cellular base station, broadband router, access point, cellular or mobile phone, gaming device, navigation device, media device, laptop computer, desktop computer, tablet computer, server, network-attached storage (NAS) device, smart appliance, vehicle-based communication system, Internet-of-Things (IoT) device, and so forth.

The base station 1104 communicates with the electronic device 1102 via the wireless link 1106, which may be implemented as any suitable type of wireless link. Although depicted as a base station tower of a cellular radio network, the base station 1104 may represent or be implemented as another device, such as a satellite, cable television head-end, terrestrial television broadcast tower, access point, peer-to-peer device, mesh network node, router, fiber optic line, another electronic device generally, and so forth. Hence, the electronic device 1102 may communicate with the base station 1104 or another device via a wired connection, a wireless connection, or a combination thereof.

The wireless link 1106 can include a downlink of data or control information communicated from the base station 1104 to the electronic device 1102 and an uplink of other data or control information communicated from the electronic device 1102 to the base station 1104. The wireless link 1106 may be implemented using any suitable communication protocol or standard, such as 3rd Generation Partnership Project Long-Term Evolution (3GPP LTE), 5G New Radio (3GPP 5GNR), IEEE 802.11, IEEE 802.16, Bluetooth™, and so forth.

The electronic device 1102 includes a processor 1108 and a computer-readable storage medium 1110 (CRM 1110). The processor 1108 may include any type of processor, such as an application processor or a multi-core processor, that is configured to execute processor-executable instructions (e.g., code) stored by the CRM 1110. The CRM 1110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 1110 is implemented to store instructions 1112, data 1114, and other information of the electronic device 1102, and thus does not include transitory propagating signals or carrier waves.

The electronic device 1102 may also include input/output ports 1116 (I/O ports 1116) or a display 1118. The I/O ports 1116 enable data exchanges or interaction with other devices, networks, or users. The I/O ports 1116 may include serial ports (e.g., universal serial bus (USB) ports), parallel ports, audio ports, infrared (IR) ports, and so forth. The display 1118 can be realized as a screen or projection that presents graphics, e.g.—one or more graphical images, of the electronic device 1102, such as for a user interface associated with an operating system, program, or application. Alternatively, or additionally, the display 1118 may be implemented as a display port or virtual interface through which graphical content of the electronic device 1102 is communicated or presented.

For communication purposes, the electronic device 1102 also includes a modem 1120, a wireless transceiver 1122, and at least one an antenna 1130. The wireless transceiver 1122 includes a converter unit (CU) 1124 and a transceiver (TRX) unit 1126. The wireless transceiver 1122 provides connectivity to respective networks and other electronic devices connected therewith using RF wireless signals. Additionally, or alternatively, the electronic device 1102 may include a wired transceiver, such as an Ethernet or fiber optic interface for communicating over a personal or local network, an intranet, or the Internet. The wireless transceiver 1122 may facilitate communication over any suitable type of wireless network, such as a wireless local area network (LAN) (WLAN) such as Wi-Fi or Bluetooth, a peer-to-peer (P2P) network, a mesh network, a cellular network (e.g., 3GPP2, 4G LTE, 5G NR, or other cellular network), a wireless wide-area-network (WWAN) (e.g., based on 3GPP2, 4G LTE, 5G NR, etc.), a navigational network (e.g., the Global Positioning System (GPS) of North America or another Satellite Positioning System (SPS)), and/or a wireless personal-area-network (WPAN). In the context of the example environment 1100, the wireless transceiver 1122 enables the electronic device 1102 to communicate with the base station 1104 and networks connected therewith. Other figures referenced herein may pertain to other wireless networks.

The modem 1120, such as a baseband modem, may be implemented as a system on-chip (SoC) that provides a digital communication interface for data, voice, messaging, and other applications of the electronic device 1102. The modem 1120 may also include baseband circuitry to perform high-rate sampling processes that can include analog-to-digital conversion (ADC), digital-to-analog conversion (DAC), gain correction, skew correction, frequency translation, and so forth. The modem 1120 may also include logic to perform in-phase/quadrature (I/Q) operations, such as synthesis, encoding, modulation, demodulation, and decoding. More generally, the modem 1120 may be realized as a digital signal processor (DSP) or a processor that is configured to perform signal processing to support communications via one or more networks. Alternatively, ADC or DAC operations may be performed by a separate component or another illustrated component, such as the wireless transceiver 1122.

The wireless transceiver 1122 can include circuitry, logic, and other hardware for transmitting or receiving a wireless signal for at least one communication frequency band. In operation, the wireless transceiver 1122 can implement at least one radio-frequency transceiver unit to process data and/or signals associated with communicating data of the electronic device 1102 via the antenna 1130. Generally, the wireless transceiver 1122 can include filters, switches, amplifiers, and so forth for routing and processing signals that are transmitted or received via the antenna 1130. Generally, the wireless transceiver 1122 includes multiple transceiver units (e.g., for different wireless protocols such as WLAN versus WWAN or for supporting different frequency bands or frequency band combinations).

The filters, switches, amplifiers, mixers, and so forth of wireless transceiver 1122 can include, in one example, at least one single-ended amplifier, switch circuitry, at least one transformer, at least one differential amplifier, and at least one mixer. In some implementations, the single-ended amplifier, which amplifies a strength of a signal, is coupled to the antenna 1130. Thus, the single-ended amplifier can couple a wireless signal to or from the antenna 1130 in addition to increasing a strength of the signal. In some implementations, the switch circuitry can switchably couple individual transformers a set of transformers to the single-ended amplifier. The set of transformers provides a physical or electrical separation between the single-ended amplifier and other circuitry of the wireless transceiver 1122. The set of transformers also conditions a signal propagating through the set of transformers. Outputs of a transformer can be coupled to one or more mixers.

Some examples can use a differential amplifier at the output of the transformer before the signal is input to a mixer. In such examples, the differential amplifier, like the single-ended amplifier, reinforces a strength of a propagating signal. The wireless transceiver can further perform frequency conversion using a synthesized signal and the mixer. The mixer may include an upconverter and/or a downconverter that performs frequency conversion in a single conversion step, or through multiple conversion steps. The wireless transceiver 1122 may also include logic (not shown) to perform in-phase/quadrature (I/Q) operations, such as synthesis, encoding, modulation, demodulation, and decoding using a synthesized signal.

In some cases, components of the wireless transceiver 1122, or a transceiver unit 1126 thereof, are implemented as separate receiver and transmitter entities. Additionally, or alternatively, the wireless transceiver 1122 can be realized using multiple or different sections to implement respective receiving and transmitting operations (e.g., using separate transmit and receive chains). Example implementations of a transceiver unit 1126 are described above. In addition, different wireless protocols such as WWAN and WLAN may be implemented on separate chips or as separate System-on-a-Chips (SoCs). As such, the blocks such as the modem 1120 and transceiver 1122 may represent more than one modem 1120 or transceiver implemented either together on separate chips or separate SoCs.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, or mobile unit, (vii) etc.

Figure 12:
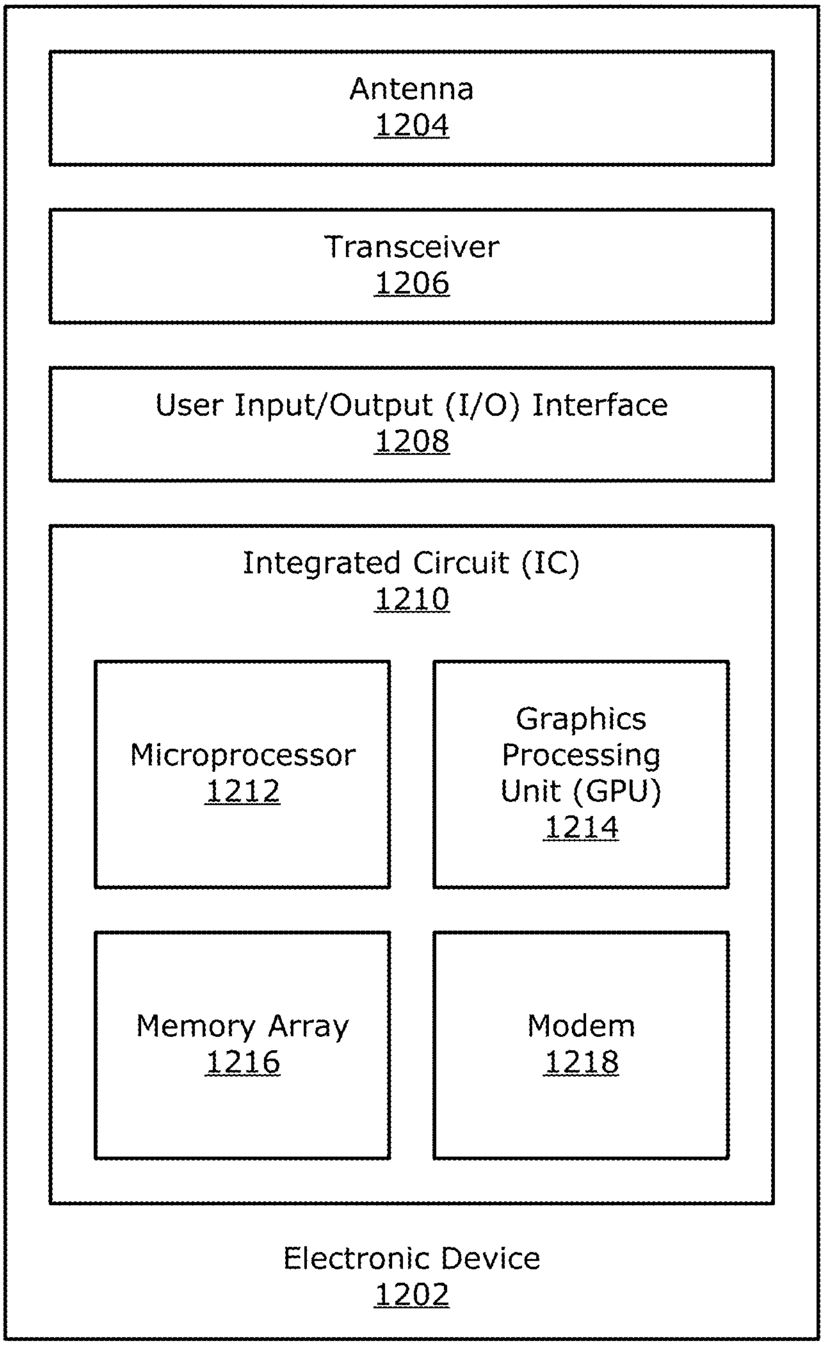
FIG. 12 is a diagram of an electronic device that can be used with aspects of the present disclosure.

FIG. 12 is a diagram illustrating an exemplary electronic device 1202, which includes a transceiver 1206 that can include and/or implement dynamic voltage supply for a power amplifier using envelope tracking in accordance with examples described herein. As shown, the electronic device 1202 includes an antenna 1204, a transceiver 1206, and a user input/output (I/O) interface 1208, in addition to the integrated circuit 1210. Illustrated examples of the integrated circuit 1210, or cores thereof, include a microprocessor 1212, a graphics processing unit (GPU) 1214, a memory array 1216, and a modem 1218. Each component can be operably coupled to another component, such as the GPU 1214 being operably coupled to the user I/O interface 1208.

The electronic device 1202 can be a mobile or battery-powered device or a fixed device that is designed to be powered by an electrical grid. Examples of the electronic device 1202 include a server computer, a network switch or router, a blade of a data center, a personal computer, a desktop computer, a notebook or laptop computer, a tablet computer, a smart phone, an entertainment appliance, or a wearable electronic device such as a smartwatch, intelligent glasses, or an article of clothing. An electronic device 1202 can also be a device, or a portion thereof, having embedded electronics. Examples of the electronic device 1202 with embedded electronics include a passenger vehicle, industrial equipment, a refrigerator or other home appliance, a drone or other unmanned aerial vehicle (UAV), or a power tool.

For an electronic device with a wireless capability, the electronic device 1202 includes an antenna 1204 that is coupled to a transceiver 1206 to enable reception or transmission of one or more wireless signals. The integrated circuit 1210 may be coupled to the transceiver 1206 to enable the integrated circuit 1210 to have access to received wireless signals or to provide wireless signals for transmission via the antenna 1204. The electronic device 1202 as shown also includes at least one user I/O interface 1208. Examples of the user I/O interface 1208 include a keyboard, a mouse, a microphone, a touch-sensitive screen, a camera, an accelerometer, a haptic mechanism, a speaker, a display screen, or a projector. The transceiver 1206 can correspond to, for example, the wireless transceiver 1122 (e.g., of FIG. 11), and can include an RF power sensor, in accordance with examples described herein.

The integrated circuit 1210 may comprise, for example, one or more instances of a microprocessor 1212, a GPU 1214, a memory array 1216, a modem 1218, and so forth. The microprocessor 1212 may function as a central processing unit (CPU) or other general-purpose processor. Some microprocessors include different parts, such as multiple processing cores, that may be individually powered on or off. The GPU 1214 may be especially adapted to process visual related data for display, such as video data images. If visual-related data is not being rendered or otherwise processed, the GPU 1214 may be fully or partially powered down. The memory array 1216 stores data for the microprocessor 1212 or the GPU 1214. Example types of memory for the memory array 1216 include random access memory (RAM), such as dynamic RAM (DRAM) or static RAM (SRAM); flash memory; and so forth. If programs are not accessing data stored in memory, the memory array 1216 may be powered down overall or block-by-block. The modem 1218 demodulates a signal to extract encoded information or modulates a signal to encode information into the signal. If there is no information to decode from an inbound communication or to encode for an outbound communication, the modem 1218 may be idled to reduce power consumption. The integrated circuit 1210 may include additional or alternative parts than those that are shown, such as an I/O interface, a sensor such as an accelerometer, a transceiver or another part of a receiver chain, a customized or hard-coded processor such as an application-specific integrated circuit (ASIC), and so forth.

The integrated circuit 1210 may also comprise a system on chip (SoC). An SoC may integrate a sufficient number of different types of components to enable the SoC to provide computational functionality as a notebook computer, a mobile phone, or another electronic apparatus using one chip, at least primarily. Components of an SoC, or an integrated circuit 1210 generally, may be termed cores or circuit blocks. Examples of cores or circuit blocks include, in addition to those that are illustrated in FIG. 12, a voltage regulator, a main memory or cache memory block, a memory controller, a general-purpose processor, a cryptographic processor, a video or image processor, a vector processor, a radio, an interface or communications subsystem, a wireless controller, or a display controller. Any of these cores or circuit blocks, such as a central processing unit or a multimedia processor, may further include multiple internal cores or circuit blocks.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1. An envelope tracking power supply, the envelope tracking power supply comprising: an envelope signal input port; an output power port; a first amplifier having an input and an output; a second amplifier having an input, an output, and a control input, wherein the control input of the second amplifier is configured to set a power state for the second amplifier; an input interface circuit having an input coupled to the envelope signal input port, a first output coupled to the input of the first amplifier, and a second output coupled to the input of the second amplifier; sensing and conditioning circuitry having an output and one or more inputs coupled to the output of the first amplifier and the output of the second amplifier; switcher circuitry having an input and an output, wherein the input is coupled to the output of the sensing and conditioning circuitry, and wherein the output is coupled to the output power port; and output filter circuitry, wherein the output of the first amplifier is coupled to the output power port via the output filter circuitry, and wherein the output of the second amplifier is coupled to the output power port via the output filter circuitry.

Aspect 2. The envelope tracking power supply of Aspect 1, wherein the first amplifier is a main amplifier configured to provide linear amplification.

Aspect 3. The envelope tracking power supply of any of Aspects 1 to 2, wherein the control input configures the power state for the second amplifier by switching the second amplifier between an on state and an off state.

Aspect 4. The envelope tracking power supply of any of Aspects 1 to 3, wherein the second amplifier is a peaking amplifier.

Aspect 5. The envelope tracking power supply of any of Aspects 3 to 4, wherein the second amplifier configured to operate in a saturation mode during the on state.

Aspect 6. The envelope tracking power supply of any of Aspects 1 to 5, wherein the control input configures the power state based on a current operating mode selected from a plurality of operating modes.

Aspect 7. The envelope tracking power supply Aspect 6, wherein the plurality of operating modes includes a high power mode and a low power mode.

Aspect 8. The envelope tracking power supply of any of Aspects 1 to 7, wherein the control input is further based on one or more of a radio access technology (RAT) configuration, a peak-to-average power ratio value of a radio frequency (RF) signal, a bandwidth of the RF signal.

Aspect 9. The envelope tracking power supply of any of Aspects 1 to 8, further comprising feedback circuitry coupled between the sensing and conditioning circuitry and the control input of the second amplifier, wherein the feedback circuitry provides a feedback signal from the sensing and conditioning circuitry to the control input to adjust a match between a power demand of a power amplifier coupled to the output power port and a voltage provided by the switcher circuitry, the first amplifier, and the second amplifier at the output power port.

Aspect 10. The envelope tracking power supply of any of Aspects 1 to 9, further comprising: a first sense element coupled between the output of the first amplifier and the input of the sensing and conditioning circuitry; and a second sense element coupled between the output of the second amplifier and a second input of the sensing and conditioning circuitry.

Aspect 11. The envelope tracking power supply of any of Aspects 1 to 9, further comprising: a first sense element coupled between the output of the first amplifier and the input of the sensing and conditioning circuitry; and a second sense element coupled between the output of the second amplifier and a second input of the sensing and conditioning circuitry.

Aspect 12. The envelope tracking power supply of any of Aspects 1 to 9, further comprising: a sense element having an input and an output, wherein the input is coupled to the output of the first amplifier and the output of the second amplifier, and wherein the output is coupled to the input of the sensing and conditioning circuitry.

Aspect 13. The envelope tracking power supply of any of Aspects 1 to 12, wherein the output filter circuitry comprises first filter circuitry coupled between the output of the first amplifier and the output power port; wherein the output filter circuitry further comprises second filter circuitry different from the first filter circuitry, wherein the second filter circuitry is coupled between the output of the second amplifier and the output power port.

Aspect 14. The envelope tracking power supply of any of Aspects 1 to 13, wherein the first amplifier is a class-AB amplifier, and wherein the second amplifier is a class-C amplifier.

Aspect 15. The envelope tracking power supply of any of Aspects 1 to 13, wherein the first amplifier is a linear amplifier.

Aspect 16. The envelope tracking power supply of any of Aspects 1 to 13, wherein the second amplifier is a switching amplifier.

Aspect 17. The envelope tracking power supply of any of Aspects 1 to 16, wherein the input interface circuit is configured to receive a digital envelope signal at the envelope signal input port; wherein the input interface circuit is configured to output a first tracking signal at the first output based on a set of least significant bits of the digital envelope signal; and wherein the input interface circuit is configured to output a second tracking signal based on one or more most significant bits of the digital envelope signal.

Aspect 18. The envelope tracking power supply of any of Aspects 1 to 17, further comprising a common stage element coupled to the input interface circuit, wherein the first output of the input interface circuit is a first output of the common stage element, and wherein the second output of the input interface circuit is a second output of the common stage element.

Aspect 19. The envelope tracking power supply of any of Aspects 1 to 18, wherein the envelope tracking power supply is coupled to a radio frequency (RF) front end (RFFE) transmit power amplifier, wherein the RFFE transmit power amplifier comprises a voltage supply input coupled to the output power port.

Aspect 20. The envelope tracking power supply Aspect 19, wherein an output of the RFFE transmit power amplifier is coupled to an antenna.

Aspect 21. The envelope tracking power supply of any of Aspects 18 to 20, wherein an output of the RFFE transmit power amplifier is coupled to an input of a power tracking coupler; wherein an output of the power tracking coupler is coupled to feedback circuitry configured to provide current supply feedback to the switcher circuitry.

Aspect 22. The envelope tracking power supply of Aspect 21, wherein the feedback circuitry is part of a transceiver, and wherein the transceiver further comprises a digital to analog circuit having an output coupled to the envelope signal input port.

Aspect 23. The envelope tracking power supply of any of Aspects 1 to 22, wherein the control input of the second amplifier is coupled to modem circuitry configured to provide envelope tracking control data to the second amplifier.

Aspect 24. The envelope tracking power supply of Aspect 23, wherein the first amplifier further comprises a control input, and wherein the modem circuitry is coupled to the control input of the first amplifier.

Aspect 25. A method comprising: calculating, by control circuitry of a modem, envelope information for a transmit signal; generating, by a radio frequency front end (RFFE), the transmit signal; providing a voltage to a power amplifier of the RFFE by an envelope tracking power supply, wherein the envelope tracking power supply comprises: an envelope signal input port configured to receive an envelope tracking signal generated from the envelope information; an output power port configured to provide the voltage to the power amplifier; a first amplifier having an input and an output; a second amplifier having an input, an output, and a control input, wherein the control input of the second amplifier is configured to program the second amplifier based on a current operating mode selected from a plurality of operating modes; an input interface circuit having an input coupled to the envelope signal input port, a first output coupled to the input of the first amplifier, and a second output coupled to the input of the second amplifier; sensing and conditioning circuitry having an output and one or more inputs coupled to the output of the first amplifier and the output of the second amplifier; switcher circuitry having an input and an output, wherein the input is coupled to the output of the sensing and conditioning circuitry, and wherein the output is coupled to the output power port; and output filter circuitry, wherein the output of the first amplifier is coupled to the output power port via the output filter circuitry, and wherein the output of the second amplifier is coupled to the output power port via the output filter circuitry.

Aspect 26. The method of Aspect 25, wherein providing the voltage to the power amplifier comprises programming the second amplifier with a control input signal at the control input, wherein the control input signal is based on the current operating mode, a radio access technology (RAT) configuration, a peak-to-average power ratio value of a radio frequency (RF) signal, or a bandwidth of the RF signal.

Aspect 27. A wireless communication apparatus comprising: means for calculating envelope information for a transmit signal; means for generating the transmit signal; means for providing an envelope tracking voltage to power a power amplifier that amplifies the transmit signal.

Aspect 28: An apparatus comprising means for performing operations according to any of aspects 1 through 26 above.

Aspect 29: A non-transitory computer-readable storage medium comprising instructions stored thereon which, when executed by one or more processors, cause the one or more processors to implement operations according to any of aspects 1 through 26 above.

What is claimed is:

1. An envelope tracking power supply, the envelope tracking power supply comprising:
- an envelope signal input port;
- an output power port;
- a first amplifier having an input and an output;
- a second amplifier having an input, an output, and a control input, wherein the control input of the second amplifier is configured to set a power state for the second amplifier;
- an input interface circuit having an input coupled to the envelope signal input port, a first output coupled to the input of the first amplifier, and a second output coupled to the input of the second amplifier, wherein the input interface circuit is configured to output a first tracking signal to the first amplifier based on a first portion of bits of an envelope signal and output a second tracking signal to the second amplifier based on a second portion of bits of the envelope signal;
- sensing and conditioning circuitry having an output and one or more inputs coupled to the output of the first amplifier and the output of the second amplifier;
- switcher circuitry having an input and an output, wherein the input is coupled to the output of the sensing and conditioning circuitry, and wherein the output is coupled to the output power port;
- output filter circuitry, wherein the output of the first amplifier is coupled to the output power port via the output filter circuitry, and wherein the output of the second amplifier is coupled to the output power port via the output filter circuitry; and
- feedback circuitry coupled between the sensing and conditioning circuitry and the control input of the second amplifier, wherein the feedback circuitry is configured to provide a feedback signal from the sensing and conditioning circuitry to the control input to adjust a match between a power demand of a power amplifier coupled to the output power port and a voltage provided by the switcher circuitry, the first amplifier, and the second amplifier at the output power port.

2. The envelope tracking power supply of claim 1, wherein the first amplifier is a main amplifier configured to provide linear amplification.

3. The envelope tracking power supply of claim 1, wherein the control input is configured to set the power state for the second amplifier by switching the second amplifier between an on state and an off state based on at least one of a voltage level or frequency envelope changes indicated by the sensing and conditioning circuitry.

4. The envelope tracking power supply of claim 1, wherein the second amplifier is configured to operate in a saturation mode during an on state.

5. The envelope tracking power supply of claim 1, wherein the control input is configured to set the power state based on a current operating mode selected from a plurality of operating modes.

6. The envelope tracking power supply of claim 5, wherein the plurality of operating modes includes a high power mode and a low power mode.

7. The envelope tracking power supply of claim 5, wherein the control input is further based on one or more of a radio access technology (RAT) configuration, a peak-to-average power ratio value of a radio frequency (RF) signal, or a bandwidth of the RF signal.

8. The envelope tracking power supply of claim 1, wherein the second amplifier is a peaking amplifier, and wherein the control input of the second amplifier is configured to set a power state for the peaking amplifier by switching the peaking amplifier between an on state and an off state.

9. The envelope tracking power supply of claim 1, further comprising:
- a first sense element coupled between the output of the first amplifier and the input of the sensing and conditioning circuitry; and
- a second sense element coupled between the output of the second amplifier and a second input of the sensing and conditioning circuitry.

10. The envelope tracking power supply of claim 1, further comprising:
- a sense element having an input and an output, wherein the input is coupled to the output of the first amplifier and the output of the second amplifier, and wherein the output is coupled to the input of the sensing and conditioning circuitry.

11. The envelope tracking power supply of claim 1, wherein the output filter circuitry comprises first filter circuitry coupled between the output of the first amplifier and the output power port;

wherein the output filter circuitry further comprises second filter circuitry different from the first filter circuitry, wherein the second filter circuitry is coupled between the output of the second amplifier and the output power port.

12. The envelope tracking power supply of claim 1, wherein the first amplifier is a class-AB amplifier, and wherein the second amplifier is a class-C amplifier.

13. The envelope tracking power supply of claim 1, wherein the first amplifier is a linear amplifier.

14. The envelope tracking power supply of claim 13, wherein the second amplifier is a switching amplifier.

15. The envelope tracking power supply of claim 1, wherein the input interface circuit is configured to receive a digital envelope signal at the envelope signal input port;

wherein the input interface circuit is configured to output the first tracking signal at the first output based on a set of least significant bits of the digital envelope signal; and wherein the input interface circuit is configured to output the second tracking signal based on one or more most significant bits of the digital envelope signal.

16. The envelope tracking power supply of claim 1, further comprising a common stage element coupled to the input interface circuit, wherein the first output of the input interface circuit is a first output of the common stage element, and wherein the second output of the input interface circuit is a second output of the common stage element.

17. The envelope tracking power supply of claim 1, wherein the envelope tracking power supply is coupled to a radio frequency (RF) front end (RFFE) transmit power amplifier, wherein the RFFE transmit power amplifier comprises a voltage supply input coupled to the output power port.

18. The envelope tracking power supply of claim 17, wherein an output of the RFFE transmit power amplifier is coupled to an antenna.

19. The envelope tracking power supply of claim 17, wherein an output of the RFFE transmit power amplifier is coupled to an input of a power tracking coupler;

wherein an output of the power tracking coupler is coupled to additional feedback circuitry configured to provide current supply feedback to the switcher circuitry.

20. The envelope tracking power supply of claim 19, wherein the additional feedback circuitry is part of a transceiver, and wherein the transceiver further comprises a digital to analog circuit having an output coupled to the envelope signal input port.

21. The envelope tracking power supply of claim 19, wherein the control input of the second amplifier is coupled to modem circuitry configured to provide envelope tracking control data to the second amplifier.

22. The envelope tracking power supply of claim 21, wherein the first amplifier further comprises a control input, and wherein the modem circuitry is coupled to the control input of the first amplifier.

* * * * *